United States Patent
Mizener et al.

(10) Patent No.: US 11,592,183 B2
(45) Date of Patent: Feb. 28, 2023

(54) SYSTEMS, APPARATUSES AND METHODS FOR IMPROVED ROTATING DETONATION ENGINES

(71) Applicant: Board of Regents, The University of Texas System, Austin, TX (US)

(72) Inventors: Andrew R. Mizener, Euless, TX (US); Frank K Lu, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 137 days.

(21) Appl. No.: 17/022,616

(22) Filed: Sep. 16, 2020

(65) Prior Publication Data
US 2021/0003285 A1    Jan. 7, 2021

Related U.S. Application Data

(63) Continuation of application No. 15/710,020, filed on Sep. 20, 2017, now abandoned.

(60) Provisional application No. 62/398,244, filed on Sep. 22, 2016.

(51) Int. Cl.
   *F23R 7/00*   (2006.01)
   *F02K 1/00*   (2006.01)
   *F02C 3/16*   (2006.01)

(52) U.S. Cl.
   CPC .............. *F23R 7/00* (2013.01); *F02K 1/002* (2013.01); *F02C 3/165* (2013.01)

(58) Field of Classification Search
   CPC ........................................................ F23R 7/00
   See application file for complete search history.

(56) References Cited

U.S. PATENT DOCUMENTS

| | | | |
|---|---|---|---|
| 2,905,234 A * | 9/1959 | Scholz | F23C 99/00 239/404 |
| 3,240,010 A | 3/1966 | Morrison | |
| 3,336,754 A | 8/1967 | Lange | |
| 3,524,590 A * | 8/1970 | Myskowski | C23C 16/45506 239/132.3 |
| 6,341,485 B1 * | 1/2002 | Liebe | F23R 3/002 60/800 |
| 7,784,267 B2 | 8/2010 | Trobita | |

(Continued)

FOREIGN PATENT DOCUMENTS

GB    1069217    * 5/1967

OTHER PUBLICATIONS

Theuerkauf "Heat Exchanger Design and Testing for a 6-Inch Rotating Detonation Engine" Air Force Institute of Technology AFIT Scholar, AFIT-ENY-13-M-33, 2013, pp. 1-67 (Year: 2013).*

(Continued)

*Primary Examiner* — Ted Kim
(74) *Attorney, Agent, or Firm* — Thomas Horstemeyer, LLP

(57) ABSTRACT

Rotating detonation engines are provided with various improvements pertaining to performance and reliability. Improvements pertain to, for example, a fluidic valve/premixing chamber, injection/swirl, flow control and turning, ignition, and cooling. A rotating detonation engine can include a cylindrical inner shell within an outer housing, a cylindrical outer shell positioned between the inner shell and the outer housing, an annular gap between the outer shell and the outer housing functioning as a detonation chamber.

12 Claims, 16 Drawing Sheets

(56) References Cited

U.S. PATENT DOCUMENTS

| | | |
|---|---|---|
| 8,544,280 B2 | 10/2013 | Lu |
| 9,816,463 B2 * | 11/2017 | Falempin .................. F23R 7/00 |
| 2007/0137171 A1 | 6/2007 | Chapin |
| 2012/0151898 A1 | 6/2012 | Claflin |
| 2014/0182295 A1 | 7/2014 | Falempin |
| 2014/0245714 A1 | 9/2014 | Falempin |
| 2015/0167544 A1 | 6/2015 | Joshi |

OTHER PUBLICATIONS

Schwer, et al., "Feedback into mixture plenums in rotating detonation engines" 50th AIAA Aerospace Sciences Meeting including the New Horizons Forum and Aerospace Exposition, Jan. 9-12, 2012.

* cited by examiner

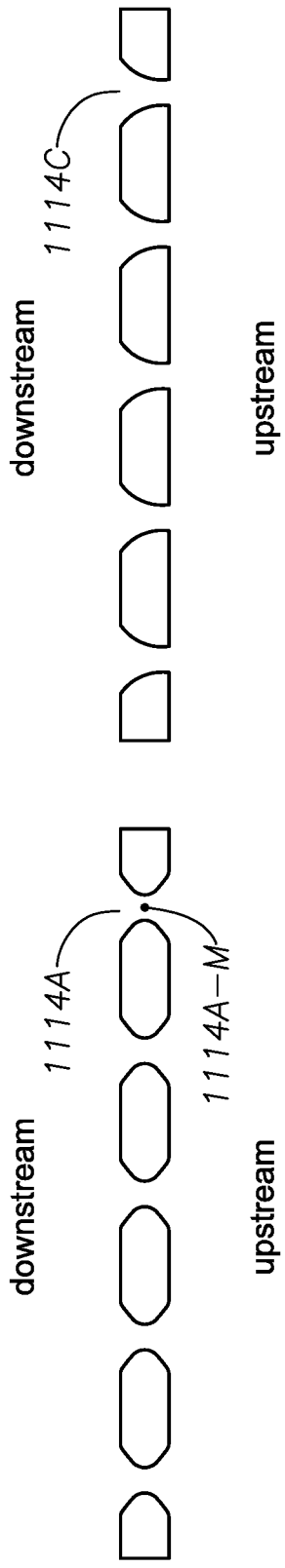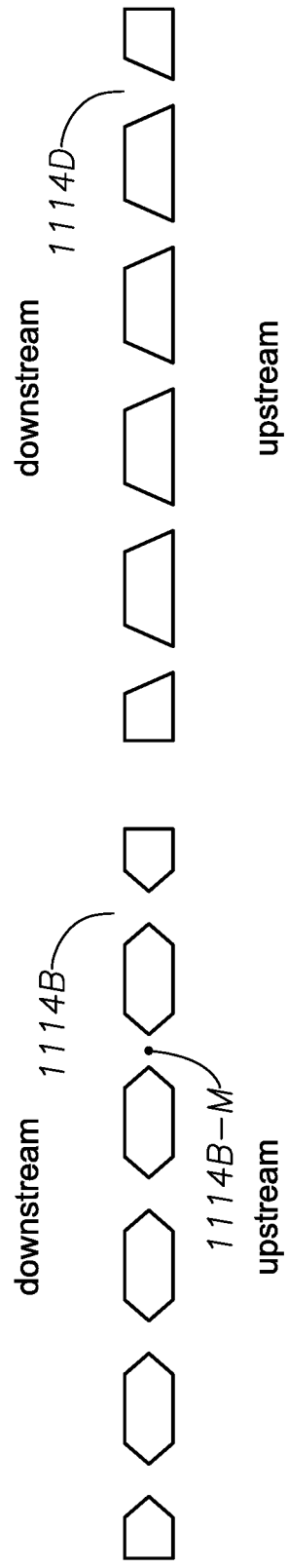

SYSTEMS, APPARATUSES AND METHODS FOR IMPROVED ROTATING DETONATION ENGINES

CROSS-REFERENCE TO RELATED APPLICATIONS

This application is a continuation of co-pending U.S. Non-Provisional Application having Ser. No. 15/710,020, entitled, "Systems, Apparatuses and Methods for Improved Rotating Detonation Engines," and filed on Sep. 20, 2017 and claims the benefit of U.S. Provisional Patent Application No. 62/398,244, entitled "Systems, Apparatuses and Methods for Improved Rotating Detonation Engines," which was filed on Sep. 22, 2016 and both of which are herein incorporated by reference in their entireties.

STATEMENT REGARDING FEDERALLY SPONSORED RESEARCH

Not applicable.

TECHNICAL FIELD OF THE INVENTION

The present disclosure relates generally to rotating detonation engines (RDEs), methods of operating the same, and systems including the same. More particularly, the disclosure relates to improvements in performance, efficiency, reliability and various other aspects of RDEs.

BACKGROUND

In a conventional combustion engine, energy from fuel is converted to useful work by a subsonic, approximately isobaric combustion process, referred to as deflagration. In contrast, a detonation wave engine such as an RDE operates by means of a supersonic, pressure-gain combustion process, referred to as detonation. The detonation may be initiated, for example, by igniting a mixture of fuel and oxidizer (e.g., air) in a detonation chamber.

Compared to conventional combustion engines, detonation wave engines have higher thermodynamic efficiencies and fewer moving parts, among other advantages. Nonetheless, challenges remain in improving RDEs for various practical applications.

SUMMARY

According to a first aspect of the invention, there is provided a rotating detonation engine (RDE) including (1) a detonation chamber configured to allow continuous detonation therein of a mixture of fuel and oxidizer, and (2) a fluidic valve upstream of the detonation chamber, configured to convey at least one of the fuel and the oxidizer into the detonation chamber.

According to a second aspect of the invention, there is provided an RDE including (1) a detonation chamber comprising a longitudinal axis and a sidewall and configured to allow continuous detonation in the detonation chamber of a mixture of fuel and oxidizer, and (2) a plurality of injection ports configured for injecting at least one of the fuel and the oxidizer into the detonation chamber. Each of the plurality of injection ports comprises an upstream end and a downstream end, and the plurality of injection ports is characterized by one of the following three conditions: (1) all of the plurality of injection ports are axial injection ports extending, at an angle greater than 0° and less than 90° relative to the longitudinal axis of the detonation chamber, from the upstream end of the respective injection port to the downstream end of the respective injection port; (2) all of the plurality of injection ports are sidewall injection ports extending in a curved manner from the upstream end of the respective injection port to the downstream end of the respective injection port; or (3) all of the plurality of injection ports are sidewall injection ports extending from the upstream end of the respective injection port to the downstream end of the respective injection port at an angle greater than 0° and less than 90° relative to the sidewall of the detonation chamber or with an effective curvature, and one of the following three sub-conditions holds: (a) all of the plurality of injection ports are disposed radially outward of the detonation chamber; (b) the radial distance from the longitudinal axis of the detonation chamber to a respective one of the injection ports is substantially identical for all of the plurality of injection ports; and (c) the effective curvature or the angle relative to the sidewall of the detonation chamber is substantially identical for all of the plurality of injection ports.

According to an third aspect of the invention, there is provided an RDE including (1) a detonation chamber configured to allow continuous detonation therein of a mixture of fuel and oxidizer, and (2) flow turning vanes installed at or near a downstream end of the detonation chamber, configured to change a direction of an exit flow from the detonation chamber.

According to a fourth aspect of the invention, there is provided an RDE including (1) a detonation chamber configured to allow continuous detonation therein of a mixture of fuel and oxidizer, and (2) an igniter configured to ignite the fuel and the oxidizer so as to initiate the continuous detonation of the mixture of fuel and oxidizer. The igniter comprises a pulse detonation engine coupled to the detonation chamber.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIGS. 11A-11D are schematic, longitudinal cross-sectional views of injection port configurations with converging-diverging or simple diverging sections, in accordance with some embodiments, with FIG. 11A showing a contoured converging-diverging configuration, FIG. 11B showing a conical converging-diverging configuration, FIG. 11C showing a contoured diverging configuration, and FIG. 11D showing a conical diverging configuration;

NOTATION AND NOMENCLATURE

Figure 1:
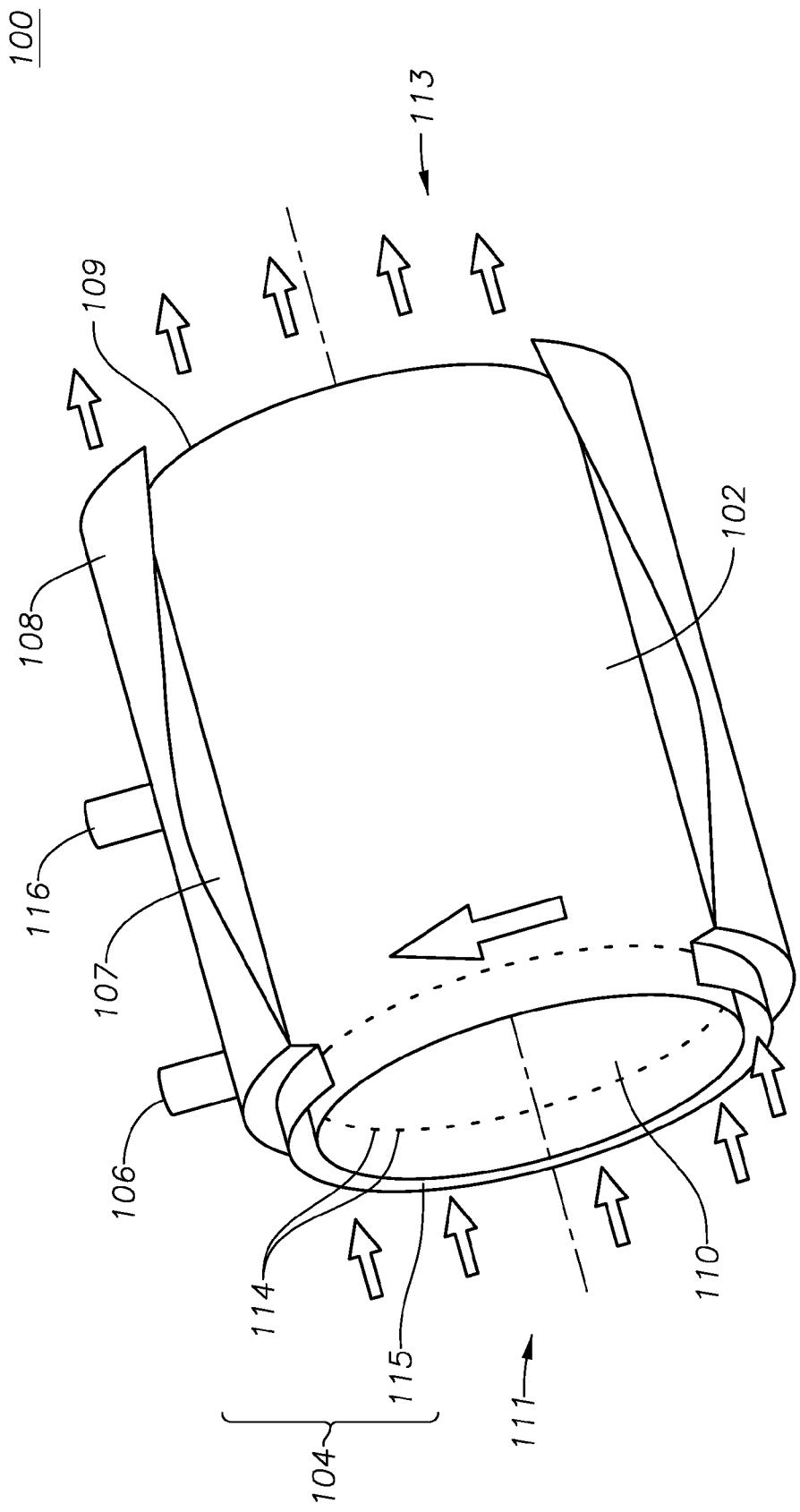
FIG. 1 is a schematic view of an RDE.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ."

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. Relatedly, certain features may be omitted in certain figures, and this may not be explicitly noted in all cases.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are necessarily described or illustrated for each embodiment disclosed in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

Detonation engines include pulse detonation engines (PDEs) and RDEs. A PDE operates by means of a series of consecutive detonations. Each detonation cycle may be referred to as a pulse. In contrast, an RDE operates by means of a continuously propagating detonation wave, described below. The basic structure and operation of PDEs and RDEs are known to one of ordinary skill in the art, and hence are not described herein in detail or comprehensively. Further description of the structure and operation of PDEs and RDEs may be found, e.g., in "Rotating Detonation-Wave Engines" by D. A. Schwer and K. Kailasanath (2011 NRL Review, pages 89-94; also available at http://www.nrl.navy.mil/content_images/11_FA2.pdf) and "Detonation Engines" by Piotr Wolanski (Journal of KONES Powertrain and Transport, Vol. 18, No. 3, 2011, pages 515-521; also available at: http://ilot.edu.pl/kones/2011/3_2011/2011_wolanski_detonation_engines.pdf), both of which articles are hereby incorporated herein by reference.

RDEs may also be referred to as "Rotating Detonation Wave Engines," "Continuous Detonation Wave Engines," and "Continuous Detonation Engines." These terms are used interchangeably herein. In addition, although the term "rotating" may be understood as connoting circular motion, the term "RDE" and its equivalents as used herein do not require circular (annular) configurations of detonation chambers and corresponding circular motion of a detonation wave. Rather, the RDEs described herein include embodiments having annular detonation chambers as well as embodiments having non-annular detonation chambers (with motion of the continuous detonation wave corresponding to the configuration of the detonation chamber, in either case).

FIG. 1 is a schematic and simplified diagram of an RDE (with various, e.g., internal, components omitted). As seen in FIG. 1, RDE 100 includes a detonation chamber 102, a means 104 for injection of fuel and oxidizer (injection means) and an igniter (or initiator) 106. The terms "propellants" and "reactants" may also be used herein to refer to fuel and oxidizer. RDE 100 may be defined by a head (or upstream) end 111 and an exit (or downstream end) 113. RDE 100 may include a nozzle (not shown) at the downstream end 113.

As shown in FIG. 1, RDE 100 is cylindrical. The axis of the cylinder (shown by the dashed line) may be referred to as the cylindrical axis, the axis, or the longitudinal axis. The longitudinal extent of RDE 100 is the extent along the longitudinal axis. (This terminology, namely, "longitudinal axis," "cylindrical axis," etc., is used for any cylindrical shape/structure in this disclosure, e.g., a cylindrical hole.) The head (upstream) end 111 and exit (downstream end) 113 of RDE 100 may be referred to as the two axial ends of RDE 100. Detonation chamber 102 is defined by an outer cylindrical wall 107 (which is the inner wall of the housing 108) and an inner cylindrical wall 109 (which is the outer wall of the centerbody 110). Accordingly, detonation chamber 102 has an annular cross section. However, as mentioned, it is possible for RDE 100 to have a shape other than a cylinder and for detonation chamber 102 to have a cross section other than annular (and hence for the continuous detonation wave to traverse a path that is other than circular), and specific embodiments with these other configurations are described below. Nonetheless, for simplicity, RDEs described herein will generally be described as cylindrical with annular detonation chambers (and hence with the continuous detonation wave propagating in a circumferential direction, or circular path, around the detonation chamber). It will be understood that any feature or embodiment described herein, although described in the context of a cylindrical RDE with annular detonation chamber, may be instantiated in a non-cylindrical RDE with non-annular detonation chamber, unless specifically indicated to the contrary.

In operation, once a detonation wave is ignited or initiated in RDE 100, the detonation wave continues in a circumferential direction around the annular detonation chamber 102, as shown by the large arrow (oriented in a generally upward direction) in FIG. 1. Fuel and oxidizer are continually injected into detonation chamber 102 in order to sustain the detonation wave. The detonation products are ejected or exhausted out of the exit 113 (as indicated by the generally horizontal, rightward pointing arrows shown at the right side of FIG. 1) to produce thrust or extract work.

Detonation is a combustion process consisting of a shock wave coupled to and sustained by a trailing combustion front. The wave speed is on the order of thousands of meters per second, compared with a flame speed on the order of tens of meters per second for deflagration. This built-in compression and rapid heat release of detonation result in lower entropy gain, and thus higher thermodynamic efficiency, as compared to deflagration, given the same initial conditions.

It should be noted that the use of the term "detonation chamber" does not mean that no non-detonative combustion ever occurs therein. Rather, non-detonative combustion may occur, and may regularly occur, in a detonation chamber of an RDE. The term "combustion chamber" may also be used in this disclosure to refer to a detonation chamber of an RDE.

Figure 16A:
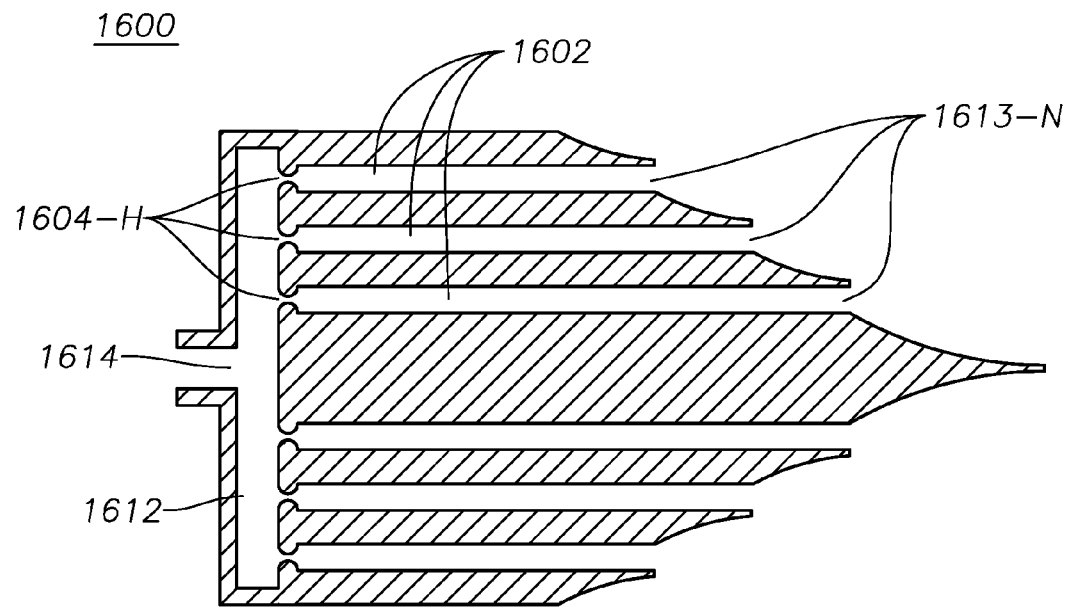
FIGS. 16A and 16B are schematic views of an arrangement of multiple concentric annular RDEs/detonation chambers, in accordance with some embodiments, with FIG. 16A being a longitudinal cross-sectional view, and FIG. 16B an axial cross-sectional view.

In addition to the aforementioned variability of the shape or configuration of the RDE 100/housing 108 and detonation chamber 102, numerous other variations in RDE 100 are possible. For example, injection means 104 is shown as including a series of holes 114 arranged circumferentially around detonation chamber 102 at/near head end 111 for injection of fuel, and an annular slit 115 at the head end of the detonation chamber 102 for injection of air (the injection of air being indicated by the generally horizontal, rightward pointing arrows shown at the left side of FIG. 1). In other embodiments, both fuel and air (or other oxidizer) may be injected through holes 114 (and slit 115 may not be provided). For example, alternating holes may be used for fuel and oxidizer, that is, a first hole may be used for fuel, a second hole next to the first hole may be used for oxidizer, a third hole next to the second hole may be used for fuel, a fourth hole next to the third hole may be used for oxidizer, and so on. In other cases, the same holes may be used for both fuel and oxidizer; for example, fuel and oxidizer may be mixed in a premixing chamber (not shown in FIG. 1) upstream of injection holes 114, and then the premixed combined fuel and oxidizer mixture may be injected into all the holes 114. Examples of this arrangement are shown in FIGS. 7F (seventh set of embodiments, pertaining to fluidic valve, described below) and 16A (ninth set of embodiments pertaining to multiple concentric RDEs, described below) (note, however, that injection holes 114 are disposed in the sidewall while the injection ports in FIGS. 7F and 16A are disposed axially; the distinction between sidewall and axial injection is clarified below). It should be understood that this arrangement (namely, premixing of fuel and oxidizer and injection of the fuel/oxidizer mixture into the same injection ports) is not limited to application with the specific features of those embodiments, but may generally be used in any embodiment in this disclosure, unless indicated to the contrary. This arrangement may be understood as comprising multiple stages (both structural and temporal stages): first, fuel and oxidizer are injected (first temporal stage) via an inlet (first structural stage) into a premixing chamber or manifold (second structural stage), where they are mixed (second temporal stage), then the mixture of fuel and oxidizer is injected (third temporal stage) via injection ports (third structural stage) into the detonation chamber.

Further to the above-described possible variations of holes 114, whether used for injecting fuel and/or air, the location of holes 114 may vary from that illustrated. For example, while holes 114 are illustrated as being disposed circumferentially around the RDE (which is referred to as sidewall injection, discussed below), it is also possible to dispose holes 114 at a head end 111 of the RDE, e.g., on head mount A (as described below for many of the embodiments in this disclosure; see FIG. 7A for head mount A). In other cases, holes 114 may be located farther downstream, farther away from head end 111 (e.g., on a sidewall of the RDE 100). While holes 114 are illustrated as supplying fuel from locations radially interior of detonation chamber 102, in other embodiments fuel and/or oxidizer may be delivered via holes from locations radially exterior to detonation chamber 102 (e.g., on a sidewall of the RDE 100). Further, while holes 114 are illustrated as cylindrical (having a uniform circular cross section throughout their longitudinal extent), they may be formed in another shape (see, e.g., the fifth set of embodiments described below). In addition, conduits other than holes may be used as injection means. The examples of variation of injection means 104 are not intended to be exhaustive. Some other variations are described in specific embodiments below. Holes 114, slit 115, and/or variations thereof such as mentioned here, may be referred to, either individually or collectively, as injectors.

As for igniter 106, some conventional RDEs have used a spark plug. Other RDEs have used a single-shot detonation tube together with a diaphragm for separating the single-shot detonation tube from the detonation chamber. Neither of these mechanisms can reliably re-start an RDE quickly. A spark plug is unpredictable. (A spark plug has the additional disadvantage of its omnidirectionality/random directionality of ignition, described below.) With the single-shot detonation tube, the diaphragm must be replaced manually after each start. As the fuel and oxidizer are injected separately in the single-shot detonation tube by low speed or manual valves, the use of the diaphragm is necessary in order to provide time for the fuel and the oxidizer to mix fully before detonation and to keep these reactants separate from the RDE during the mixing process. Accordingly, the spark plug and single-shot detonation tube are not able to provide quick and reliable re-starting of the RDE, whereas the ability to provide for quick and reliable re-starting of the RDE is important in practical applications.

RDE 100 may also include one or more pressure transducer ports 116 (one shown). Pressure transducer port 116 may accommodate a pressure transducer (not shown) for measuring pressure in the detonation chamber 102.

According to a first set of embodiments, instead of a conventional spark plug or single-shot detonation tube, the igniter may include a PDE. Unlike a conventional spark plug or single-shot detonation tube, a PDE (which is equipped with appropriate ignition, valving, injection, and timing systems) is able to send multiple ignition pulses back-to-back in rapid succession, thus permitting high-frequency operation of the RDE and quick and reliable re-starting (and without manual intervention). A PDE is configured as a tube that can be repeatedly (i.e., as needed) filled with a detonable gas and ignited. In operation of a PDE, combustion transitions from deflagration at the head end (upstream end) of the PDE to detonation at the exit (downstream end). For this transition to occur, the PDE must have a certain minimum length (which may vary depending on the parameters of the PDE arrangement). The PDE may be coupled to the detonation chamber 102 by a direct coupling (conduit) without a diaphragm. A diaphragm is not required with the PDE, as the PDE uses precise flow rate controls and ignition timing mechanisms to ensure that the PDE fills with fuel and oxidizer rapidly and to the proper amount, and the PDE's injection systems promote rapid mixing of the reactants.

FIGS. 2-5 illustrate variations of a PDE igniter coupled to the detonation chamber of an RDE. (The PDE igniter may be referred to simply as a PDE. For simplicity, the coupling of the PDE to the detonation chamber of the RDE may be described as the coupling of the PDE to the RDE.) Variations of the arrangement of a PDE igniter coupled to an RDE, other than those illustrated in FIGS. 2-5, are also possible. As for the scale of these figures, the PDE may be 35 inches in length, and the RDE may be 6 inches in diameter. Other dimensions are also possible. As mentioned, in operation a detonation wave exits from the downstream end of the PDE. In the embodiments of FIGS. 2-5, this detonation wave is conducted (via a coupling, described below) to the detonation chamber of the RDE. Entering the detonation chamber of the RDE, the detonation wave triggers detonation of the reactants (fuel and oxidizer) in the detonation chamber of the RDE. As described above, once a detonation wave is ignited or initiated in the RDE, the detonation wave continues in a circumferential direction around the detonation chamber.

Figure 2:
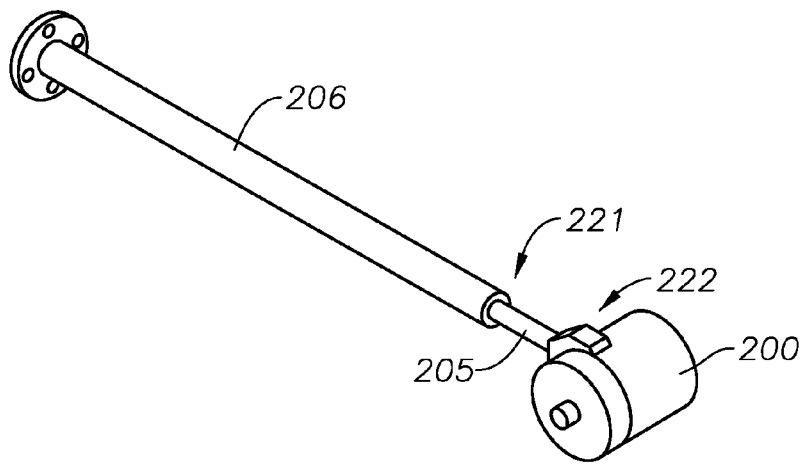
FIG. 2 is a schematic, perspective view of an RDE with a PDE igniter disposed in a tangential configuration relative to the RDE, in accordance with some embodiments.

FIG. 2 is a three-dimensional perspective view of an RDE, with a PDE igniter in a tangential configuration relative to the RDE.

As seen in FIG. 2, RDE 200 is coupled to PDE igniter 206 by a coupling 205. PDE 206 and coupling 205 may be formed together as a single integral element or as two physically distinct and separate elements that are joined together. Coupling 205 is connected to PDE 206 at a distal end (or PDE interface end) 221 of coupling 205, and coupling 205 is connected to (the detonation chamber of) RDE 200, at or near the upstream end of the detonation chamber, at a proximal end (or RDE interface end) 222 of coupling 205. (The upstream end of RDE 200, and hence of the detonation chamber thereof, is the end shown in the foreground in FIG. 2; the downstream end of RDE 200 is in the background of the figure and is not visible to the viewer.) Coupling 205 may have any length (i.e., distance between the distal end 221 and the proximal end 222 thereof).

As mentioned, PDE igniter 206 has a tangential configuration relative to RDE 200. By "tangential" configuration is understood a configuration in which PDE igniter 206 is disposed in a tangential position relative to the (detonation chamber of) RDE 200. That is, if PDE igniter 206 were to extend all the way to RDE 200 (e.g., in the absence of coupling 205), it would contact or intersect with the (detonation chamber of) RDE 200. While FIG. 2 shows PDE 206 as lying in a direction perpendicular to (or disposed at an angle of 90 degrees relative to) RDE 200, the tangential configuration does not require this perpendicularity relative to RDE 200. For example, PDE 206 could be disposed at a different angle (e.g., >0 degrees, <180 degrees, and not equal to 90 degrees) relative to RDE 200. The tangential configuration contrasts with the parallel and coiled configurations described below with reference to FIGS. 3-5.

Figure 3:
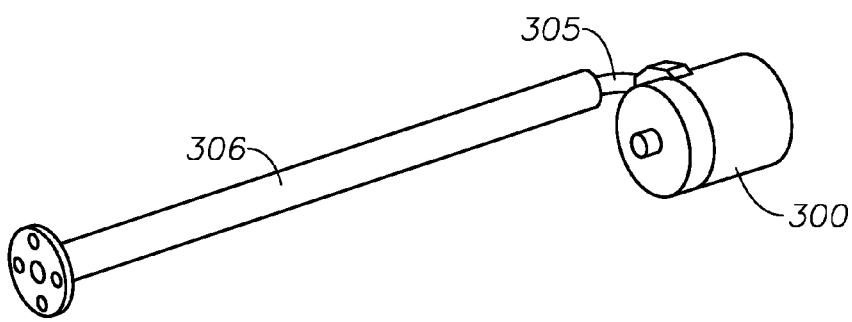
FIG. 3 is a schematic, perspective view of an RDE with a PDE igniter disposed in a parallel configuration relative to the RDE and disposed upstream of the RDE, in accordance with some embodiments.

FIG. 3 is a three-dimensional perspective view of an RDE 300, with a PDE igniter 306 in a parallel configuration relative to RDE 300 and disposed upstream of RDE 300.

By "parallel" configuration is understood a configuration in which PDE igniter 306 is disposed parallel to the (detonation chamber of) RDE 300. Thus, if PDE igniter 306 were extended farther downstream relative to RDE 300, it would remain parallel to RDE 300 and would not contact or intersect with the RDE 300.

As seen in FIG. 3, RDE 300 is coupled to PDE igniter 306 by a coupling 305. The above description of coupling 205 applies also to coupling 305. But, as seen in FIGS. 2 and 3, while coupling 205 is straight and tangential (indeed, perpendicular) to RDE 200, coupling 305 has a curved elbow configuration such as to effect a 90 degree turn from the direction of PDE 306, so as to connect to RDE 300 tangentially (indeed, perpendicularly). Thus, both coupling 205 and coupling 305 connect with respective RDEs 200 and 300 tangentially, indeed, perpendicularly. This tangential connection of the coupling 205, 305 with the RDE 200, 300 is desirable, as the injection of the detonation wave from the PDE 206, 306 into the RDE 200, 300 in the tangential direction helps direct the detonation being initiated in the RDE 200, 300 to propagate in the desired direction, that is, circumferentially around the detonation chamber. Propagation in the circumferential direction is necessary to sustain a continuous detonation wave in the RDE 200, 300. Thus, the tangential coupling with the RDE is advantageous compared, e.g., to prior art spark plug ignition, in which the spark ignition is omnidirectional (and the resulting direction of detonation propagation appears to be a matter of chance) and hence does not generally assist in directing the detonation wave in the desired, circumferential direction.

Figure 4:
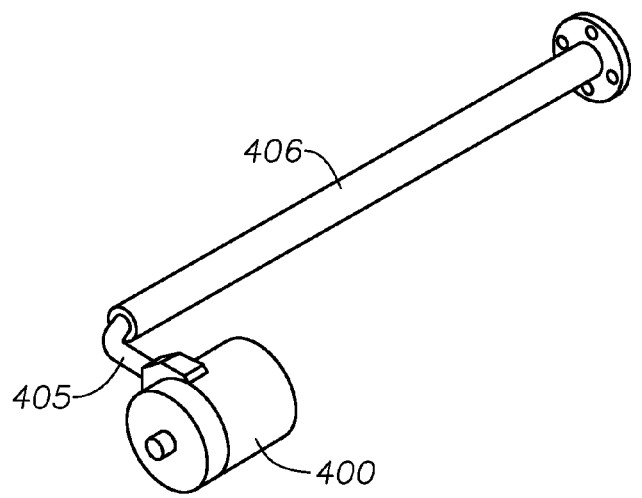
FIG. 4 is a schematic, perspective view of an RDE with a PDE igniter disposed in a parallel configuration relative to the RDE and disposed downstream of the RDE, in accordance with some embodiments.

FIG. 4 is a three-dimensional perspective view of an RDE 400, with a PDE igniter 406 in a parallel configuration relative to RDE 400 and disposed downstream of RDE 400.

The embodiments of FIG. 4 are the same as the embodiments of FIG. 3, and the foregoing description of the latter applies also to the former, except that in FIG. 4 the PDE 406 is downstream of the RDE 400 while in FIG. 3 the PDE 306 is upstream of the RDE 300 (and, concomitantly, the curved elbow couplings 305 and 405 effect right-angle turns in directions opposite to each other in order to couple with the respective RDE 300 or 400; if coupling 305 is deemed to effect a 90 degree turn, coupling 405 would be deemed to effect a 270 turn).

Figure 5:
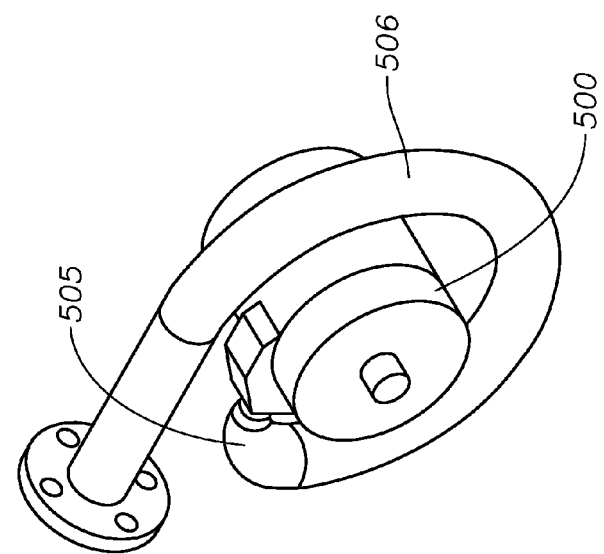
FIG. 5 is a schematic, perspective view of an RDE with a PDE igniter disposed in a coiled configuration relative to the RDE, in accordance with some embodiments.

FIG. 5 is a three-dimensional perspective view of an RDE 500, with a PDE igniter 506 in a coiled configuration relative to RDE 500.

By "coiled" configuration is understood a configuration in which PDE igniter 506 is coiled around the (detonation chamber of) RDE 500 concentrically therewith, as illustrated. The above description of the embodiments of FIG. 2 applies to the embodiments of FIG. 5, except for the fact that PDE 506 is coiled whereas PDE 206 is tangential, and the concomitant difference between coupling 505 and coupling 205. Coupling 505 effects a 90 degree turn so as to couple with RDE 500, like couplings 305 and 405, but the turn is in a plane parallel to an axial cross section of RDE 500 (i.e., a cross section perpendicular to the cylindrical axis of RDE 500), whereas in the case of couplings 305 and 405 the 90 degree turn is in a plane perpendicular to an axial cross section of RDE 300, 400, as seen in FIGS. 3-5. At the proximal end of coupling 505 (i.e., the end at which it couples to RDE 500), it is tangential (and perpendicular) to RDE 500, like couplings 205, 305 and 405. As will be understood by one of ordinary skill in the art, the curvature of the coiled PDE 506 should not exceed a certain maximum, as discussed, e.g., in "Stable Detonation Wave Propagation in Rectangular-Cross-Section Curved Channels," by H. Nakayama, T. Moriya, J. Kasahara, A. Matsuo, Y. Sasamoto, and I. Funaki (Combustion and Flame, Vol. 159, Iss. 2, 2012, pages 859-869), which article is hereby incorporated herein by reference.

The different variations, such as the tangential, parallel (upstream), parallel (downstream), and coiled configurations, facilitate use of a PDE igniter with an RDE in different applications. The PDE requires a relatively long length in order to achieve the deflagration to detonation transition. In some operational environments, it may not be feasible to accommodate the full length of the PDE in a certain direction/position relative to the RDE. Accordingly, the other configurations described here are available for use. For example, where the available space is very limited and inadequate to accommodate the fully extended length of the PDE in any direction, the coiled configuration may be used. Thus, depending on the spatial requirements, etc. of the RDE application, one or more of the different PDE configurations or any variation described here may be suitable for use with the RDE.

Figure 6:
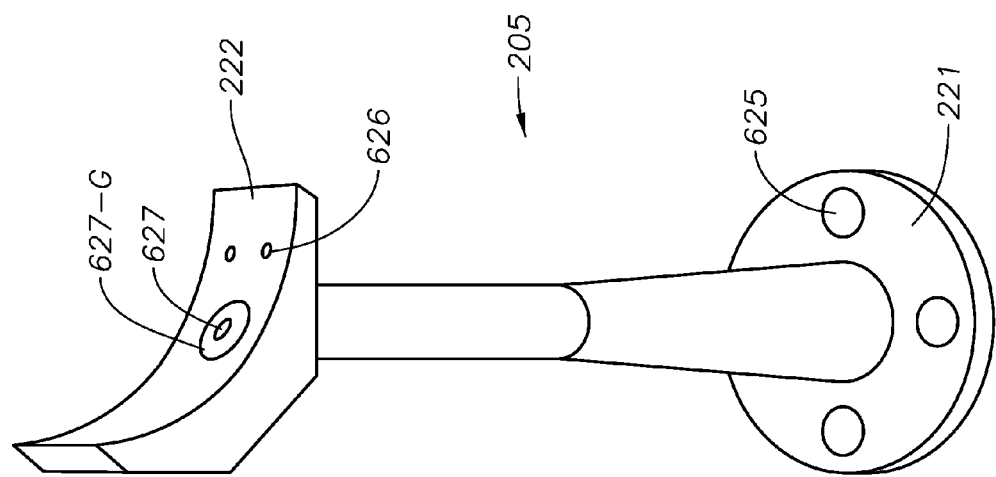
FIG. 6 is an enlarged perspective view of the coupling of FIG. 2, in accordance with some embodiments.

FIG. 6 is an enlarged, close up, perspective view of coupling 205 showing more detail than FIG. 2. As seen in FIG. 6, coupling 205 may have multiple mounting or connection holes 625 at distal end (PDE interface end) 221 for mounting or connecting to PDE 206 and multiple mounting or connection holes 626 at proximal end (RDE interface end) 222 for mounting or connecting to RDE 200. The number and arrangement of holes may vary. Any suitable one or more connection means may be used for connecting to PDE 206 and RDE 200, as will be appreciated by one of ordinary skill in the art; such means need not include holes such as 625 and 626. The long main body portion of coupling 205 may be tubular, serving as a conduit for the detonation wave from the PDE 206 to the RDE 200, as described above. The hole 627 at the proximal end 222 of this tubular portion is seen in FIG. 6, disposed in the center of the four illustrated mounting holes 626. The hole at the distal end 221 of this tubular portion is not visible in FIG. 6, being located underneath proximal end 222 (given the orientation of proximal end 222 in FIG. 6); however, this hole is similarly located at the center of mounting holes 625. Proximal end 222 is curved so as to fit on the cylindrical (surface of the) housing of the RDE 200, which is equipped with holes corresponding to holes 626 and 627 for communicating with holes 626 and 627, respectively, for the purpose of physical connection and inflow of the detonation wave to the RDE 200, respectively. Likewise PDE 206 is equipped with holes corresponding to holes 625 and the hole at the distal end 221 of the tubular portion of coupling 205, for the purpose of physical connection and inflow of the detonation wave from the PDE 206, respectively. Gasket 627-G, surrounding hole 627, is discussed below.

According to a second set of embodiments, the engine core or centerbody region of the RDE (i.e., the center region, radially inward of the annular detonation chamber) is used for active cooling of the radially inner annular wall of the detonation chamber. Due to the tremendous heat release in operation, RDEs are understood not to permit being operated for long durations of time such as are suitable for real world applications. For example, the radially inner annular wall of the detonation chamber can become very hot and fail, since in operation of the RDE the centerbody (i.e., the portion radially inward of the detonation chamber) is understood to become a heat sink, that is, heat from operation of the RDE (i.e., heat from the detonation chamber) is continuously directed through the radially inner annular wall of the detonation chamber into the centerbody. Providing cooling in the region radially inward of the detonation chamber is therefore useful to mitigate this problem.

A general description of this second set of embodiments is as follows. An RDE includes a detonation chamber configured to allow continuous detonation therein of a mixture of fuel and oxidizer, and a coolant channel configured to allow a fluid to flow therethrough. The coolant channel is disposed radially inward of the detonation chamber. More specifically, the coolant channel is disposed adjacent a radially inner wall of the detonation chamber. Still more specifically, the RDE may further include a coolant inlet configured to allow coolant to enter the coolant channel, and a coolant outlet configured to allow coolant to exit the coolant channel. More specifically, the coolant channel may include a coolant supply channel disposed adjacent a radially inner wall of the detonation chamber, the coolant supply channel configured to allow the fluid to flow from the coolant inlet through the coolant supply channel to cool the detonation chamber, and a coolant return channel disposed radially inward of the coolant supply channel, the coolant return channel configured to allow the fluid, after having flown through the coolant supply channel, to flow through the coolant return channel to the coolant outlet.

A more detailed description of this second set of embodiments will be provided with reference to FIGS. 7A-7G. In the discussion below, initially, each of FIGS. 7A-7G will be described simply so as to enumerate the components shown therein. Afterward, aspects of the operation of RDE 700, including further detail of its components, will be described with reference to various ones of FIGS. 7A-7G.

Figure 7A:
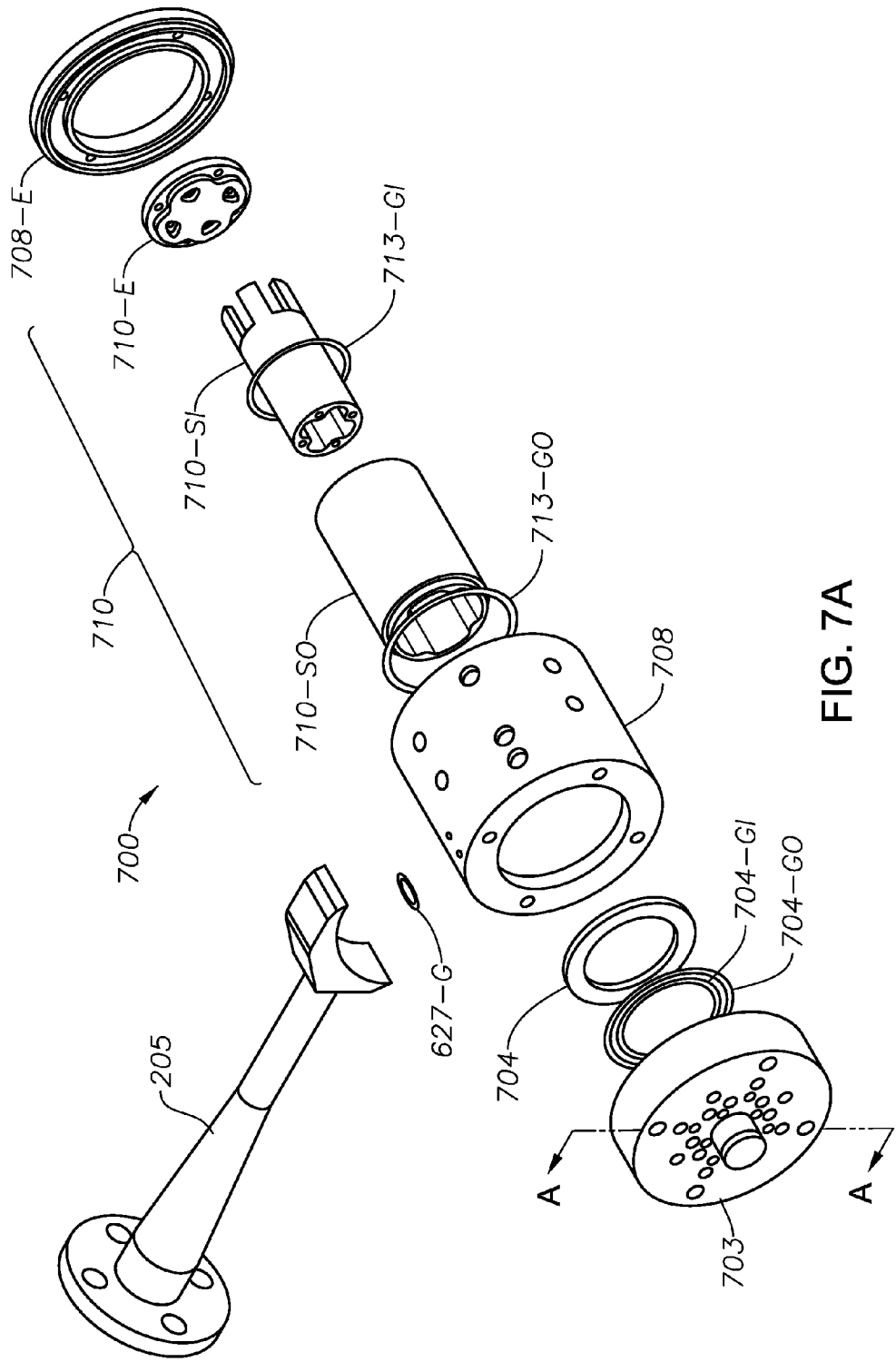
FIGS. 7A-7G are schematic views of an RDE or portions thereof, in accordance with some embodiments, with FIG. 7A being an exploded, perspective view thereof and further including the coupling of FIGS. 2 and 6, FIG. 7B being a perspective view of the housing thereof, FIG. 7C being a perspective view of the head mount (downstream face) thereof, FIG. 7D being a perspective view of the centerbody endcap (upstream face, with gasket) thereof, FIG. 7E being a perspective view of the core assembly (without centerbody endcap) thereof, FIG. 7F being a longitudinal cross-sectional view thereof, taken along the line A-A in FIG. 7A, and FIG. 7G being an axial cross-sectional view thereof or equivalently an elevational view thereof taken from the rear, with the centerbody endcap and housing endcap removed.

FIG. 7A is an exploded, three-dimensional perspective view of an RDE. Each of FIGS. 7B-7G is a view of a portion of RDE 700 of FIG. 7A.

FIG. 7A shows RDE 700 and coupling 205. One difference between RDE 700 and RDE 100 is that RDE 700 has axial injection ports 714 (FIG. 7C) for fuel and oxidizer while RDE 100 has axial injection slit 115 for oxidizer and sidewall injection ports 114 for fuel. As seen from left to right in the exploded view of FIG. 7A, RDE 700 includes the following components: head mount 703; outer injector gasket 704-GI; inner injector gasket 704-GO; injector plate 704; housing 708; outer exhaust end gasket 713-GO; centerbody outer shell 710-SO; centerbody inner shell 710-SI; inner exhaust end gasket 713-GI; centerbody endcap 710-E; housing endcap 708-E. Coupling gasket 627-G seals the interface between coupling 205 and RDE 700. It is noted that the centerbody 710 of the RDE 700 may be understood as including centerbody outer shell 710-SO, centerbody inner shell 710-SI, and centerbody endcap 710-E.

As used in this disclosure, the terms "axial injection," "axial injection ports" and the like refer to injection/injection ports in which the fuel and/or oxidizer is injected into the RDE at the upstream axial end of the RDE (i.e., at the front face of head mount 703) or at a plane (planar surface) substantially parallel to the upstream axial end. The upstream axial end of the RDE or a plane parallel thereto is perpendicular to the longitudinal/cylindrical axis of the RDE. In axial injection the fuel and/or oxidizer is injected into the RDE in a direction that may be axial (i.e., coincident with or parallel to the longitudinal/cylindrical axis of the RDE), substantially axial, or including an axial component. Axial injection ports may but need not be located at the upstream end of the RDE, where they are injecting fuel and/or oxidizer into the RDE from outside the RDE; in some cases, axial injection ports may be located within the RDE. In contrast to axial injection/injection ports, the terms "sidewall injection," "sidewall injection ports" and the like refer to injection/injection ports in which the fuel and/or oxidizer is injected into the RDE at a sidewall of the RDE (e.g., along the long, annular portion of housing 708, not the upstream or downstream end of housing 708) or a surface substantially parallel thereto. The sidewall of the RDE or a plane parallel thereto is parallel to the longitudinal/cylindrical axis of the RDE; the sidewall of the RDE refers generally to the portion of the exterior of the RDE that is not the upstream or downstream end of the RDE. (In the terminology of geometry with regard to a cylinder, the circular bases of the cylinder would correspond to the upstream and downstream ends of the RDE, and the annular surface extending along the height or length of the cylinder would correspond to the sidewall of the RDE; as noted, an RDE need not be cylindrical.) In sidewall injection the fuel and/or oxidizer is injected into the RDE in a direction that may be radial (i.e., perpendicular to the longitudinal/cylindrical axis of the RDE), substantially radial, or including a radial component. Sidewall injection ports may but need not be located at the exterior surface of the side (e.g., housing 708) of the RDE, where they are injecting fuel and/or oxidizer into the RDE from outside the RDE; in some cases, sidewall injection ports may be located within the RDE. Examples of the distinction between axial and sidewall injection/injection ports may be seen, inter alia, in the sixth set of embodiments discussed below, where FIGS. 12A-12D and 13 illustrate axial injection/injection ports and FIGS. 14A and 14B illustrate sidewall injection/injection ports. FIG. 7C illustrates another example of axial injection/injection ports.

Figure 7B:
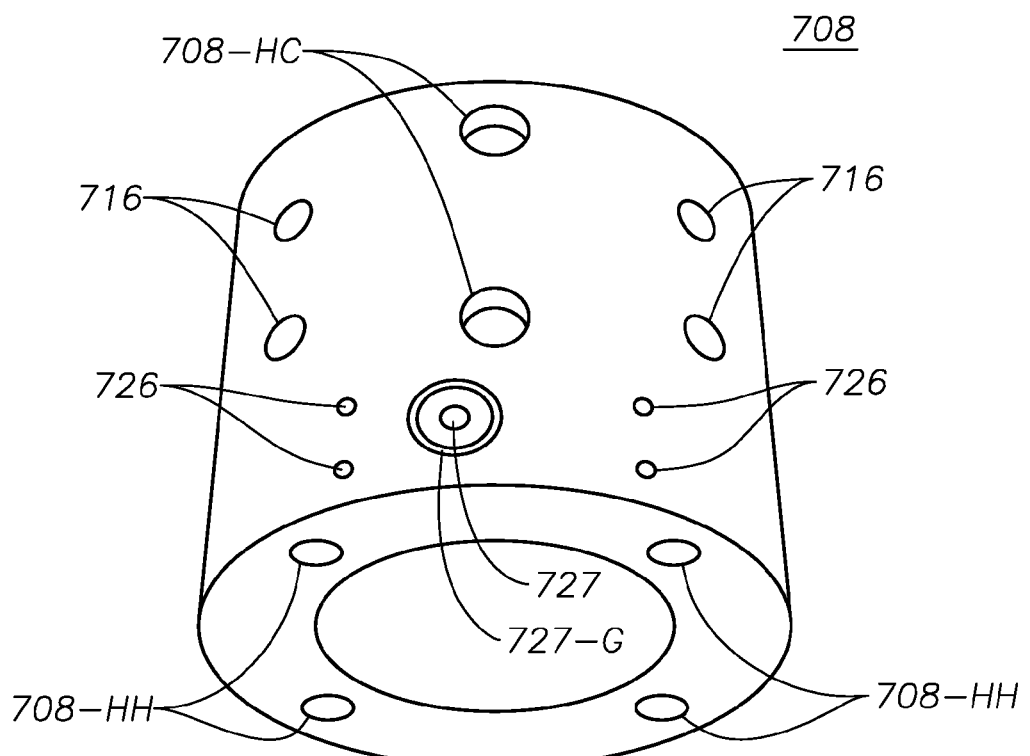
Figure 7C:
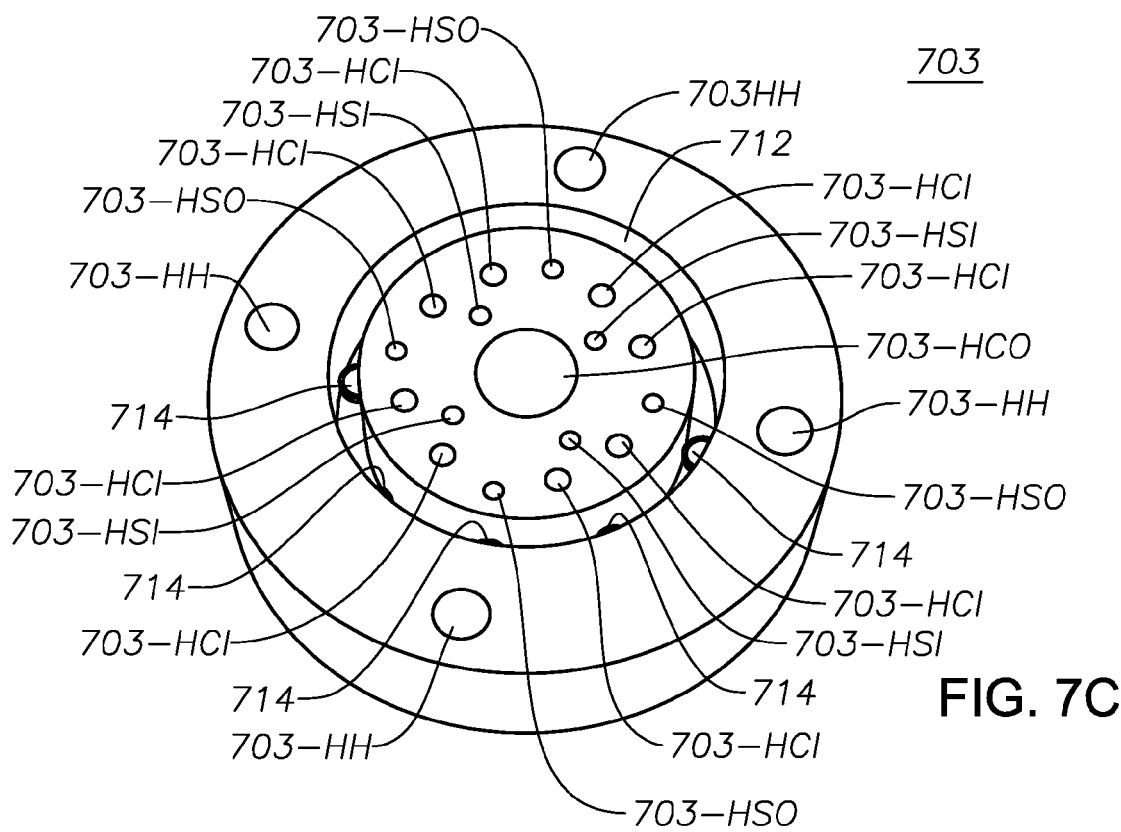

FIG. 7B is a perspective view of housing 708. Housing 708 includes four PDE-coupling mounting holes 726 for mounting (physically connecting) coupling 205 to housing 708, and ignition hole 727, centered between PDE-coupling mounting holes 726, for inflow of the detonation wave from (PDE 206 via) coupling 205. Consistent with the above discussion with reference to FIG. 6, PDE-coupling mounting holes 726 on RDE 700 interface with holes 626 (FIG. 6) on coupling 205, and ignition hole 727 on RDE 700 interfaces with hole 627 (FIG. 6) on coupling 205. As further seen in FIG. 7B, an annular gasket groove 727-GG is provided around ignition hole 727 for mounting therein sealing gasket 627-G (FIGS. 6 and 7A), for sealing this junction point between coupling 205 and RDE 700. (Sealing gasket 627-G is discussed in the fourth set of embodiments below.) Housing 708 further includes two coolant holes 708-HC, one for inlet to the auxiliary coolant channel and one for outlet from the auxiliary coolant channel. The two holes 708-HC are interchangeable: the assignment of one for inlet and the other for outlet may be reversed. Housing 708 further includes four head-mount-housing mounting holes 708-HH for mounting the head mount 703 to the housing 708. Housing 708 further includes eight pressure transducer holes 716 (four shown) for interface with a pressure transducer (not shown). Unless indicated to the contrary, the locations and numbers of the various holes in RDE 700 (as illustrated in FIG. 7B or other figures) may differ from what is illustrated, as will be understood by one of ordinary skill in the art.

FIG. 7C is a perspective view of the head mount 703, looking at the downstream face thereof. Head mount 703 includes a fluidic valve/mixing chamber 712 (discussed below), which appears as an annular channel or trough. Fuel and oxygen is conveyed into fluidic valve/mixing chamber 712 by eight propellant injection holes 714 in head mount 703 (in FIG. 7C, the lower five holes 714 are shown, and the upper three are hidden from view due to the orientation of the perspective view). Head mount 703 further includes eight (four pairs of) coolant inflow holes 703-HCI and one coolant outflow hole 703-HCO. Head mount 703 further includes four head-mount-housing mounting holes 703-HH for mounting the head mount 703 to the housing 708. Head-mount-housing mounting holes 703-HH interface with head-mount-housing mounting holes 708-HH of housing 708, described above with reference to FIG. 7B, to achieve the physical connection between head mount 703 and housing 708. Head mount 703 includes four centerbody-outer-shell-head mount mounting holes 703-HSO for mounting (physically connecting) head mount 703 to centerbody outer shell 710-SO, and four centerbody-inner-shell-head mount mounting holes 703-HSI for mounting (physically connecting) head mount 703 to centerbody inner shell 710-SI.

Figure 7D:
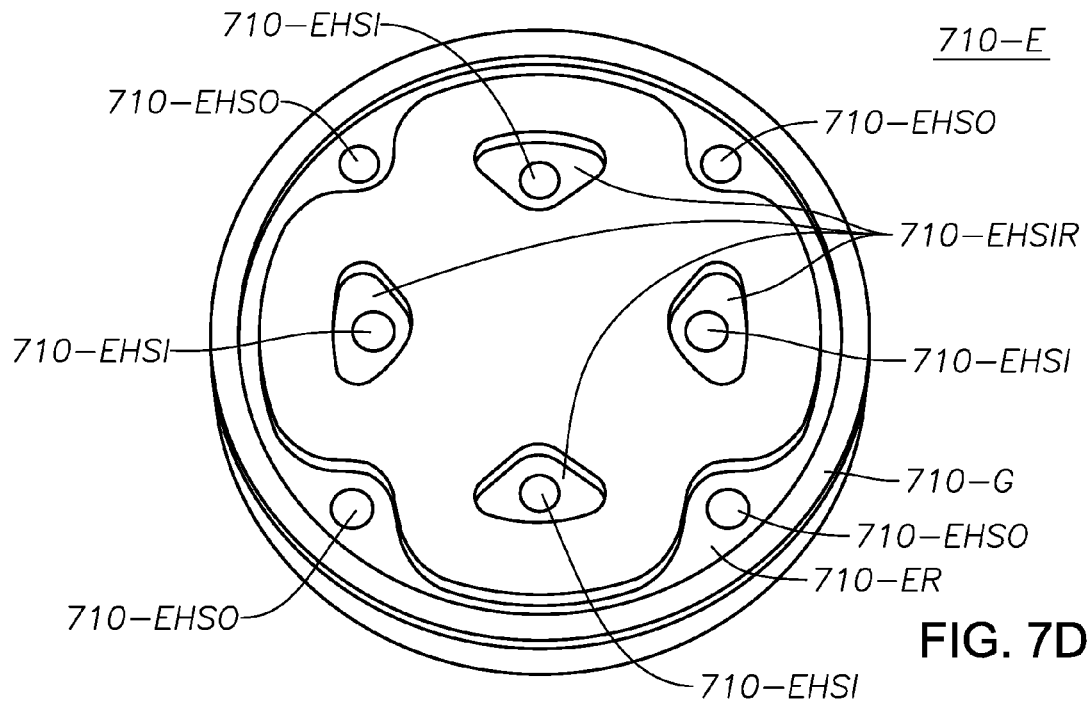

FIG. 7D is a perspective view of the centerbody endcap 710-E, looking at the upstream face thereof. The upstream face of centerbody endcap 710-E includes a recessed circumferential annular region 710-ER (recessed into the surface of endcap 710-E and hence recessed into the plane of the page), which mates with a corresponding region of centerbody outer shell 710-SO for mounting thereon. Furthermore, the radially outermost portion of recessed circumferential annular region 710-ER includes a groove (not shown), which is recessed into the surface of region 710-ER and hence further recessed into the plane of the page), on which a mating (e.g., copper) gasket 710-G is seated. When so seated, the upstream surface (appearing in the foreground in the figure) of copper gasket 710-G is raised above the surface of recessed circumferential annular region 710-ER. Copper gasket 710-G serves to seal the interface between centerbody outer shell 710-SO and centerbody endcap 710-E. Centerbody endcap 710-E also includes four centerbody-outer-shell-centerbody-endcap mounting holes 710-EHSO for mounting (physically connecting) centerbody endcap 710-E to centerbody outer shell 710-SO, and four centerbody-inner-shell-centerbody-endcap mounting holes 710-EHSI for mounting (physically connecting) centerbody endcap 710-E to centerbody inner shell 710-SI. Centerbody-inner-shell-centerbody-endcap mounting holes 710-EHSI are disposed in respective recesses 710-EHSIR that fit and mate with centerbody inner shell 710-SI, for mounting centerbody endcap 710-E to centerbody inner shell 710-SI.

Figure 7E:
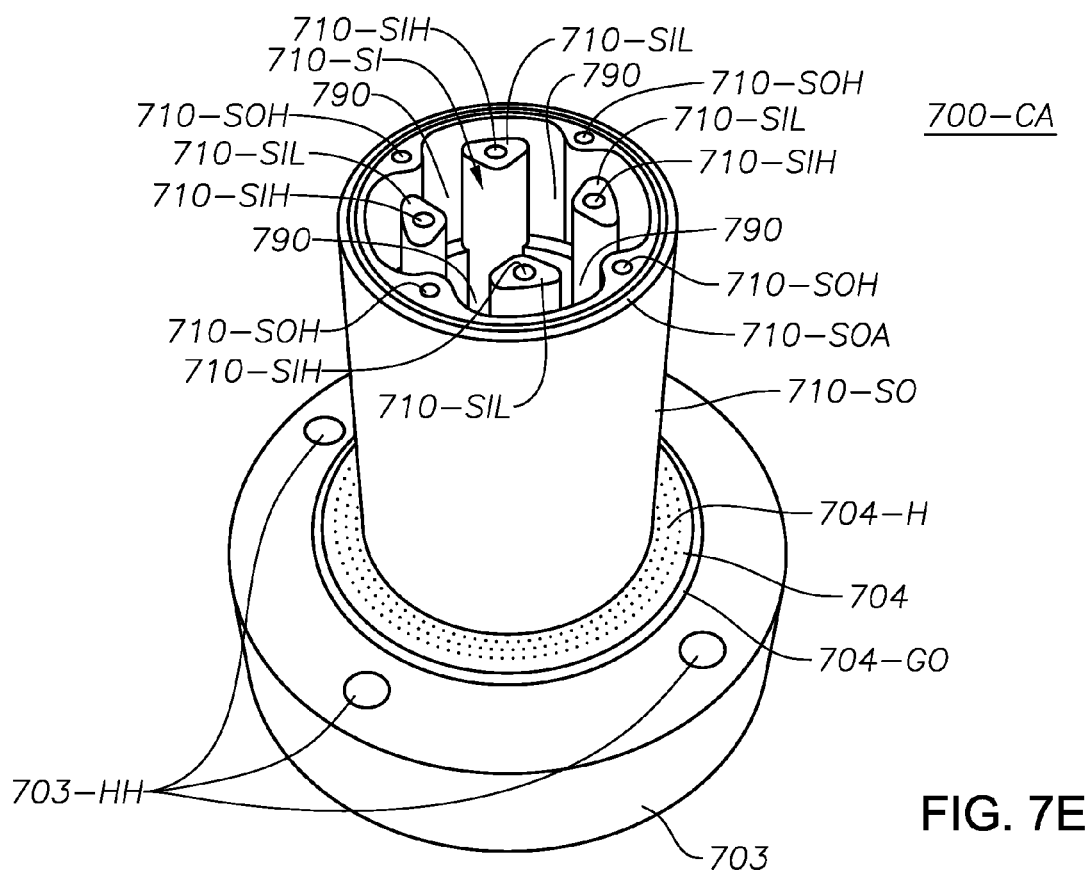
Figure 7F:
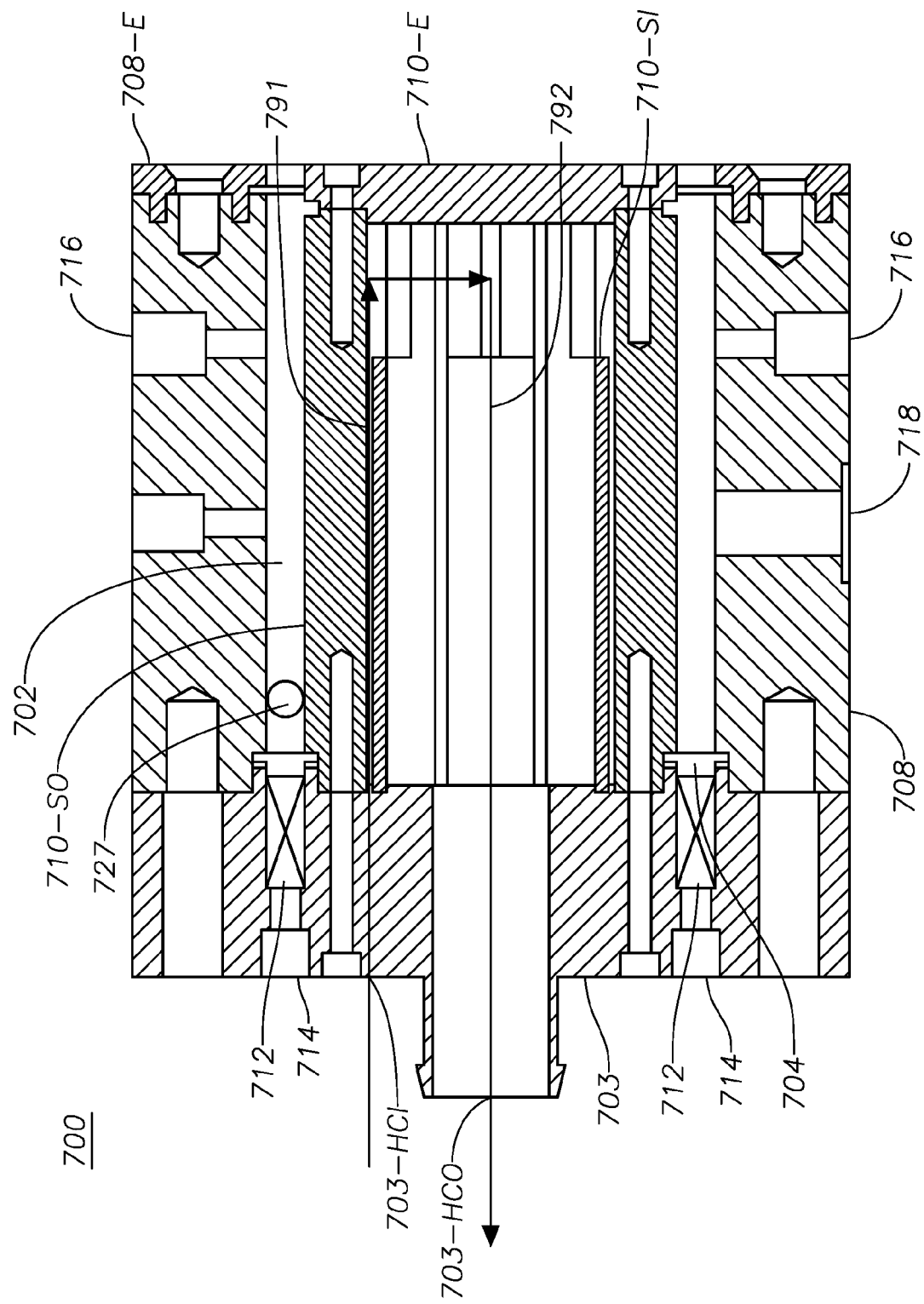

FIG. 7E is a perspective view of the core assembly 700-CA of RDE 700, but without the centerbody endcap 710-E. The core assembly 700-CA as shown includes head mount 703, outer injector gasket 704-GO; inner injector gasket 704-GI (not visible in the figure); injector plate 704; centerbody outer shell 710-SO; and centerbody inner shell 710-SI. Injector plate 704 includes injector holes 704-H for injection of propellant into the detonation chamber (annular region radially between housing 708 and centerbody outer shell 710-SO). Centerbody outer shell 710-SO includes four centerbody-outer-shell-centerbody-endcap mounting holes 710-SOH for mounting (physically connecting) centerbody endcap 710-E to centerbody outer shell 710-SO. Similarly, centerbody inner shell 710-SI includes four centerbody-inner-shell-centerbody-endcap mounting holes 710-SIH for mounting (physically connecting) centerbody endcap 710-E to centerbody inner shell 710-SI. Centerbody outer shell 710-SO also includes a circumferential annular region 710-SOA for mating with recessed circumferential annular region 710-ER of centerbody endcap 710-E, and with gasket 710-G which is seated in region 710-ER, gasket 710-G serving to seal the interface between centerbody outer shell 710-SO and centerbody endcap 710-E. As for the mating, circumferential annular region 710-SOA is recessed over an annular subregion thereof including the circumference of centerbody outer shell 710-SO, and unrecessed over an annular subregion thereof radially inward of the recessed annular subregion. The unrecessed annular subregion mates with recessed circumferential annular region 710-ER of centerbody endcap 710-E, while the recessed annular subregion mates with gasket 710-G, which rises above the surface of recessed circumferential annular region 710-ER. Coolant recirculation ports 790 (discussed below) are seen between the legs 710-SIL of centerbody inner shell 710-SI, one port 790 between each pair of adjacent legs 710-SIL. Also seen in FIG. 7E are head-mount-housing mounting holes 703-HH, described above with reference to FIG. 7C.

FIG. 7F is a longitudinal cross-sectional view of RDE 700, taken along the line A-A in FIG. 7A (of course, in FIG. 7F, RDE 700 is assembled, in contrast to the exploded view of FIG. 7A). FIG. 7F shows the following components of RDE 700 already mentioned with reference to FIGS. 7A-7E: head mount 703, propellant injector holes 714, coolant inflow hole 703-HCI, coolant outflow hole 703-HCO, fluidic valve/mixing chamber 712, injector plate 704, ignition hole 727, housing 708, centerbody outer shell 710-SO, centerbody inner shell 710-SI, centerbody endcap 710-E, housing endcap 708-E, and pressure transducer holes 716. In addition, FIG. 7F shows detonation chamber 702, coolant supply channel 791 and coolant return channel 792 (discussed below), and a spark plug hole 718 for a spark plug, which serves as a backup ignition means.

Figure 7G:
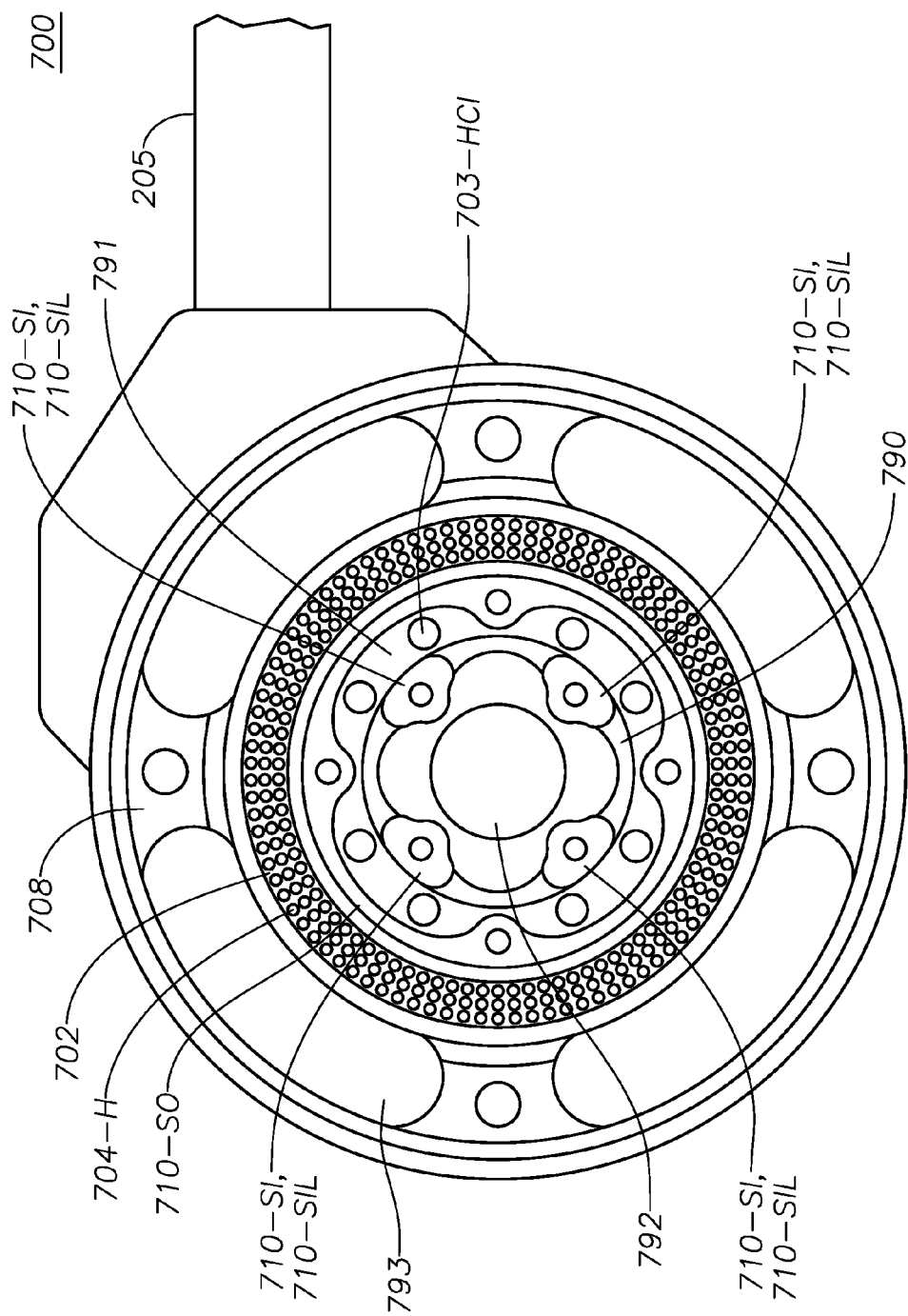

FIG. 7G is an elevational view of RDE 700 taken from the rear, with the centerbody endcap 710-E and housing endcap 708-E (see FIG. 7A) removed. FIG. 7G shows the following components of RDE 700 already mentioned with reference to FIGS. 7A-7F: housing 708, detonation chamber 702, injection holes 704-H, centerbody outer shell 710-SO, centerbody inner shell 710-SI, (four) coolant supply channels 791, (eight) coolant inlet holes 703-HCI, coolant return channel 792, and (four) coolant recirculation ports 790. In addition, FIG. 7G shows (four) auxiliary coolant channels 793. Coolant supply channel 791 and coolant return channel 792 may also be referred to as central or inner coolant (supply and return) channels, as they are located radially within detonation chamber 702, as described above and as seen in FIG. 7G, while auxiliary coolant channels 793 may also be referred to as outer or peripheral coolant channels, as they are located radially outward of detonation chamber 702, as seen in FIG. 7G. While injection holes 704-H are of course located upstream of detonation chamber 702, nonetheless detonation chamber 702 is indicated here to facilitate understanding of the radial relationship between detonation chamber 702 and coolant channels 791, 792 and 793. It is also understood that coolant inlet holes 703-HCI are of course upstream of supply channel 791; it will be noted that in the embodiment here illustrated each (non-circular cross section) supply channel 791 has two (circular cross section) inlet holes 703-HCI. The number of channels may be varied.

As seen in FIGS. 7C and 7F, coolant enters RDE 700 through coolant inlet holes 703-HCI and exits RDE 700 through a single coolant outlet hole 703-HCO, both the coolant inlet holes 703-HCI and the coolant outlet hole 703-HCO being disposed in the head mount 703. The coolant inlet holes 703-HCI are arranged in a circular pattern that is radially in between the center and the circumference of the circularly shaped head mount 703. The coolant outlet hole 703-HCO is located at the center of the circularly shaped head mount 703. The number and arrangement pattern of the inlet holes 703-HCI and the outlet holes 703-HCO may differ from that illustrated. As mentioned, in other embodiments, the RDE, and hence the head mount, need not be circular (cylindrical) in shape.

As seen in FIG. 7F and in part in FIG. 7G, the coolant, supplied through the coolant inlet holes 703-HCI, travels downstream (rightward in FIG. 7F) through the annular gap between the centerbody outer shell 710-SO and the centerbody inner shell 710-SI, all or most of the longitudinal extent of the centerbody 710 and detonation chamber 702, and then returns upstream (leftward in FIG. 7F) through the hollow center (tubular portion) of the centerbody inner shell 710-SI to the coolant outlet hole 703-HCO in the head mount 703, where it exits the RDE 700. The annular gap between the centerbody outer shell 710-SO and the centerbody inner shell 710-SI may be referred to as the aforementioned coolant supply channel 791, and the hollow center (tubular portion) of the centerbody inner shell 710-SI may be referred to as the aforementioned coolant return channel 792.

The return upstream of the inflow coolant is achieved via coolant recirculation ports 790. As shown in FIGS. 7E and 7G, the coolant recirculation ports 790 may be understood as the gaps between the legs 710-SIL of centerbody inner shell 710-SI (these gaps and the four legs 710-SIL together, circumferentially along their radially outward faces, define a circle in FIG. 7G, which circle is the circumference of centerbody inner shell 710-SIH). Restating the flow of coolant in terms of FIG. 7E, the coolant flows in to RDE 700 from head mount 703, travels downstream (upward in FIG. 7E) through the coolant supply channel 791 (mostly not visible in FIG. 7E), i.e., the annular gap between centerbody outer shell 710-SO and centerbody inner shell 710-SI, is redirected 180 degrees at the coolant recirculation ports 790, and then flows upstream (downward in FIG. 7E) through the coolant return channel 792 (mostly not visible in FIG. 7E), i.e., through the hollow center of centerbody inner shell 710-SI, back to the head mount 703. The annular gap between centerbody outer shell 710-SO and centerbody inner shell 710-SI is visible in FIG. 7E as the annular gap between the legs 710-SIL of centerbody inner shell 710-SI and the centerbody outer shell 710-SO.

Note that the annular region between the centerbody outer shell 710-SO and the housing 708 is the detonation chamber 702, as seen in FIGS. 7F and 7G. Accordingly, the centerbody outer shell 710-SO is the radially inner annular wall of the detonation chamber 702. Since the coolant inflow flows along the centerbody outer shell 710-SO (specifically, between the centerbody outer shell 710-SO and the centerbody inner shell 710-SI), the coolant serves to cool the radially inner annular wall of the detonation chamber 702, and hence the detonation chamber 702 and the RDE 700.

As further seen in FIG. 7G, RDE 700 may be provided with one or more auxiliary coolant channels 793 disposed radially outward of detonation chamber 702. Specifically, as illustrated, four additional coolant channels 793 may be provided in housing 708. The numbers and arrangement of the additional coolant channels 793 may vary from what is illustrated. The name "auxiliary" given to coolant channels 793 is not to be taken as limiting the structure or functioning of these elements. Auxiliary coolant channels 793 may but need not be secondary in function to coolant channels 791 and 792; auxiliary coolant channels 793 may also be referred to as "additional" coolant channels. Auxiliary coolant channels 793 may extend from a position at, near, or toward the front (upstream end) to a position at, near, or toward the back (downstream end) of the RDE 700 or of the detonation chamber 702. Each of these additional coolant channels 793 is provided with two ports (referred to above as coolant holes) 708-HC (FIG. 7B), one at the aforementioned upstream position and one at the aforementioned downstream position. These ports 708-HC may be disposed on the outer wall of the housing 708, as illustrated in FIG. 7B. The two ports 708-HC for a given channel 793 are used as inlet and outlet ports, respectively, that is, one port 708-HC is used for inlet and the other port 708-HC is used for outlet (at any given time). The two ports 708-HC for a given channel 793 are interchangeable between inlet and outlet functionality. That is, coolant may be flowed in at the upstream port 708-HC (which is thus used as an inlet), run downstream, and flowed out at the downstream port 708-HC (which is thus used as an outlet), or coolant may be flowed in at the downstream port 708-HC (which is thus used as an inlet), run upstream, and flowed out at the upstream port 708-HC (which is thus used as an outlet). As these additional coolant channels 793 run inside of housing 708 along a wall of housing 708 that separates housing 708 from the detonation chamber 702, these additional coolant channels 793 may be used (in addition to or instead of the above-described coolant channels 791 and 792 that are disposed radially inward of the detonation chamber 702) to cool the detonation chamber 702. These additional coolant channels 793 may also be used to cool pressure sensors (not shown) disposed in the housing 708 (if pressure sensors are used in the given RDE application). Holes 716 for accommodating such pressure sensors are illustrated in FIGS. 7B and 7F. Note that FIG. 7F does not show the additional coolant channels 793 disposed in housing 708 because the section illustrated in FIG. 7F goes through the pressure sensor holes 716 and not through the additional coolant channels 793.

The coolant may be any suitable fluid as would be understood by one of ordinary skill in the art, for example, a gaseous or liquid propellant (including cryogenic propellants), water, or a dedicated refrigerant. Preferably, the coolant should be able to cool the detonation chamber 702 without igniting, corroding the walls, or having another destructive effect. The coolant may start cold (i.e., by cryogenics or some other method of precooling) or at room temperature, as long as it has the capacity to absorb heat. High thermal conductivity and low initial temperature are preferred, as they aid in heat transfer. In some embodiments, if cooling of the radially inner annular wall of the detonation chamber 702 is not required (e.g., if alternative cooling of the detonation chamber 702 is provided), or if the above-described portion of the cooling system that is radially inward of the detonation chamber 702 does not take up all of the space available inside the centerbody 710, the space available in the centerbody 710 may be used to store propellant (fuel and/or oxidizer), to house electronics, avionics, sensors, etc., to preheat the reactants, or for any number of other productive uses.

A third set of embodiments provides techniques and structures for cooling the detonation chamber 702, further to the use of coolant described in the second set of embodiments. These techniques and structures generally serve to enhance heat transfer. Some of these techniques and structures involve modifications or treatment of a cold-side surface of a wall (or the like) across which heat transfer occurs, a cooler fluid flowing on the cold-side of the wall to effect heat transfer from a hotter region of the RDE on the other side of the wall. In this case, the wall across which heat transfer occurs is a wall of the detonation chamber 702, which may be either the radially outer or radially inner wall. As one example, the wall may be the radially inner wall and/or the radially outer wall of the detonation chamber, and the heat transfer effected by the coolant of the second set of embodiments may be enhanced by techniques and structures of the third set of embodiments.

Figure 8:
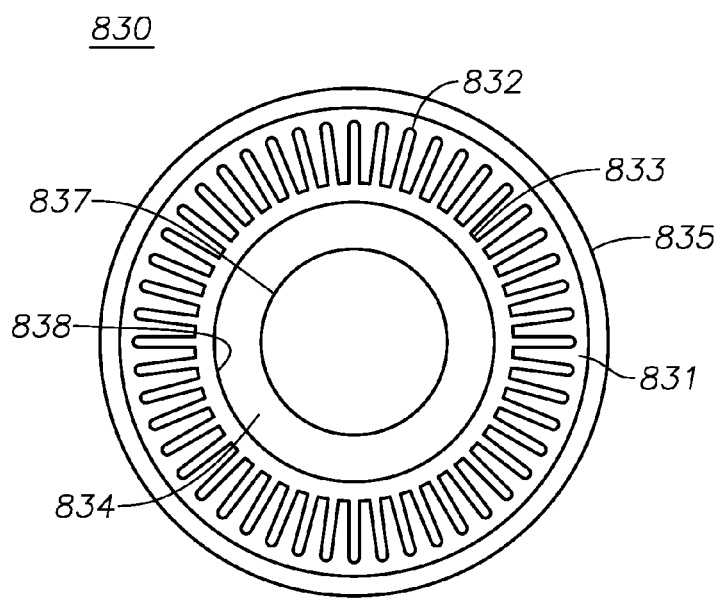
FIG. 8 is a schematic, axial cross-sectional view showing fins on the surface of an annular coolant channel of an RDE, in accordance with some embodiments.
Figures 9A, 9B, 9C:
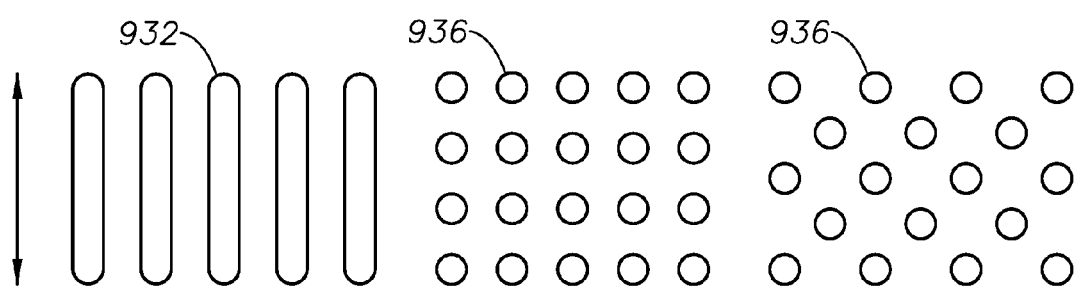
FIGS. 9A-9C are schematic plan views showing arrangements of surface projections for use in a coolant channel of an RDE, in accordance with some embodiments, with FIG. 9A showing the fins of FIG. 8, FIG. 9B showing fins configured as cylindrical posts arranged in an aligned arrangement, and FIG. 9C showing fins configured as cylindrical posts arranged in an offset arrangement.
Figure 10:
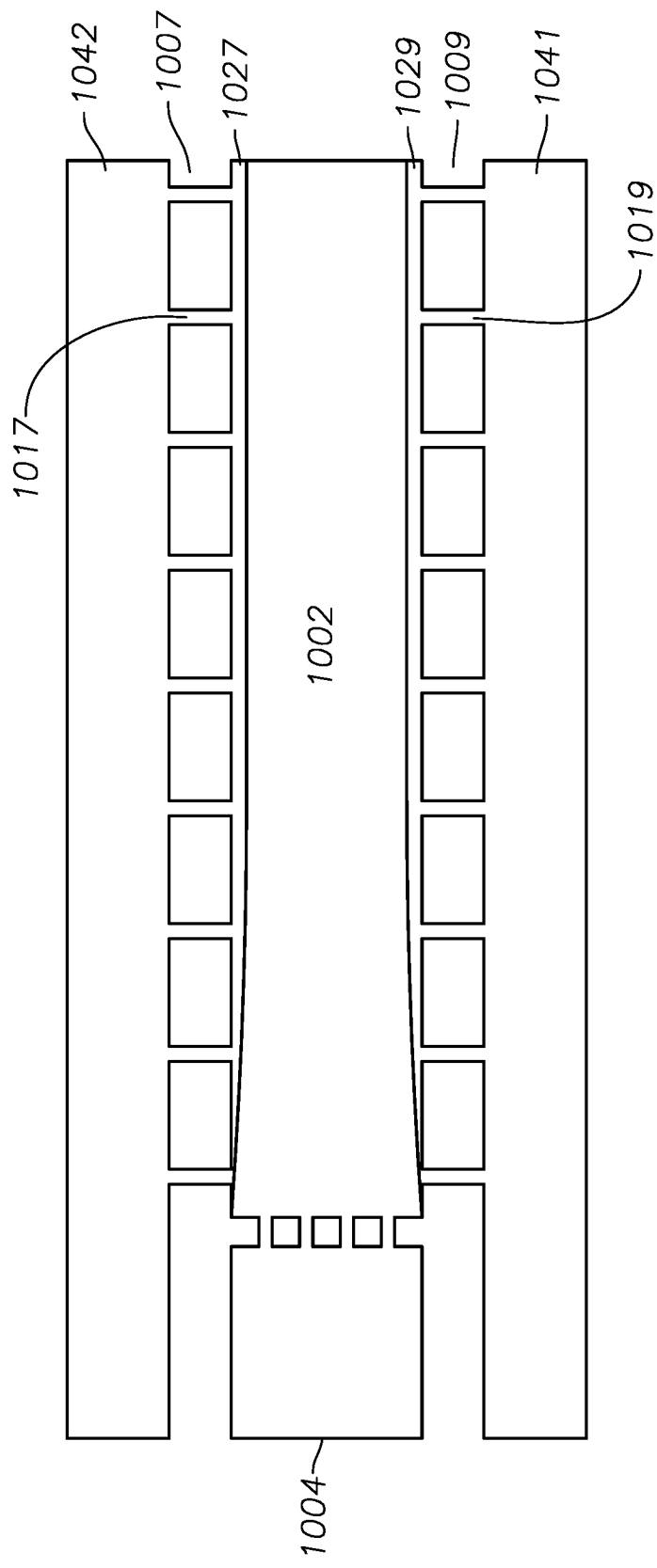
FIG. 10 is a schematic, fragmentary, longitudinal cross-sectional view of an RDE, illustrating transpiration cooling, in accordance with some embodiments.

A more detailed description of this third set of embodiments will be provided with reference to FIGS. 8-10.

According to a first subset of the third set of embodiments, a cold-side surface across which heat transfer occurs in the RDE may be treated in such a manner that the surface is rendered rough, not smooth. The surface may be a surface of a wall of the detonation chamber, e.g., a cold-side surface of the radially outer wall or radially inner wall of an annular detonation chamber. For example, the heat transfer effected by the coolant of the second set of embodiments may be enhanced by rendering the surface of the radially inner side (cold side) of the radially inner wall (centerbody outer shell 710-SO) of the detonation chamber 702 (i.e., the radially inner one of the two exterior (cold) sides of the annular detonation chamber 702) rough. In other embodiments the surface of another wall, e.g., the cold-side surface of the radially outer wall of the detonation chamber 702 (i.e., the radially outer one of the two exterior (cold) sides of the annular detonation chamber 702), may be made rough (the effectiveness of this assumes that the surface in question is in contact with a fluid that effects heat transfer from the detonation chamber 702).

Increasing surface roughness enhances the heat transfer (achieved by the coolant that is flowing in contact with the surface) in two ways. First, surface roughness increases the surface area of the cold-side wall that is in contact with the coolant, so there is at any time a greater area over which heat transfer occurs. Second, surface roughness promotes the transition of the flow of the coolant from laminar to turbulent flow. Turbulent flow provides for significantly improved heat transfer as compared to the more orderly laminar flow. Surface roughness is relatively easy to implement in a narrow confined space, such as in the cooling section of the centerbody, and surface roughness does not significantly impede flow. Finally, surface roughness is well-suited to any type of cooling fluid, e.g., a gaseous or liquid propellant (including cryogenic propellants), water, or a dedicated refrigerant.

According to a second subset of the third set of embodiments, a cold-side surface across which heat transfer occurs in the RDE may be provided with fins, vanes, or other surface-area-increasing structures. More generally, all of these structures may be referred to as projections (projecting outward from the surface), although it is also possible to increase the surface area with depressions or indentations (projecting inward into the surface). The cold-side surface in question may be a cold-side surface of a wall of the detonation chamber 702, as described above with respect to the surface roughness embodiments.

Compared to surface roughness, the projections mentioned here are very large, greatly increasing the surface area. There are innumerable possible configurations/shapes and arrangements of the projections, examples of which are illustrated in FIGS. 8 and 9A-9C. FIG. 8 shows an axial cross section of a cylindrical structure 830, including an annular region 831 through which coolant flows (perpendicularly to the plane of the page), with fins 832 on the radially inner wall or surface 833 of the two annular walls or surfaces (833, 835) defining annular region 831. In this arrangement, the region 834, which is radially inward of region 831, may be the detonation chamber 702 and the region 831 may be comparable to the above-described additional cooling channel 793 in the housing 708. In other embodiments, fins 832 may be applied to the radially outer surface (i.e., the surface closest to the detonation chamber 702) of the above-described coolant supply channel 791, which is radially inward of the detonation chamber 702. In either case, the cooling of the detonation chamber 702 by heat transfer to the coolant flowing through the radially adjacent coolant channel (e.g., 793 or 791) provided with fins 832 is enhanced by the fins 832. In other embodiments, the outer periphery wall 835 could be omitted, the radially inner wall or surface 833 could be the exterior wall/surface of the housing 708, the region 834 could be the detonation chamber 702, and vanes 832 could serve to enhance the heat transfer achieved by the flow of ambient air over the exterior wall/surface 833 of the housing 708 (or by the exposure of the housing 708 to outer space).

Fins 832 may be configured as vertical walls relative to the annular wall or surface 833 from which they project, as illustrated in FIG. 8. Given the annular configuration of region 831 and wall/surface 833, the fins 832 extend radially outward from wall/surface 833. Though not visible due to the cross-sectional nature of the FIG. 8, fins 832 also extend in the direction into/out of the plane of the page. FIG. 9A is a plan view of vanes 932 comparable to vanes 832 but not formed around an annular wall/surface such as wall/surface 833, the view looking down on the vanes 932 from above. The long direction (indicated by the double-headed arrow) of vanes 932 in FIG. 9A corresponds to the direction into/out of the plane of the paper in FIG. 8. With this signification, the double-headed arrow applies also to FIGS. 9B and 9C, which are plan views, like FIG. 9A, but of other types and arrangements of projections. Specifically, these two figures show projections 936 configured as vertical cylindrical posts relative to the surface from which they project. In FIG. 9B, these projections 936 are arranged in rows and columns, all of the rows, columns, and projections 936 aligned with one another, respectively. In FIG. 9C, these projections 936 are arranged in rows and columns, such that every other row is aligned with one another and the two rows in any pair of adjacent rows are offset with respect to one another, and the columns are arranged in the same manner. The arrangement of FIG. 9B may be referred to as an "aligned" arrangement, while that of FIG. 9C may be referred to as an "offset" arrangement, even though in some sense the arrangement of FIG. 9C is still aligned or regular. It is also possible to provide projections that are arranged in irregular arrangements. Also, shapes of projections other than those illustrated are possible. (To be sure, the axial cross-sectional view of FIG. 8 may also be understood as depicting the vertical posts 936 as arranged in FIG. 9B or 9C.)

Projections such as those discussed here, in addition to increasing surface area, may generally cause the flow of the coolant to transition from a laminar flow to a turbulent flow. While these projections may be substantially more effective in these respects than surface roughness, such individual projections may also cause blockage of the coolant flow and thus may not be optimal for tightly enclosed spaces. These projections are well-suited to any type of cooling fluid, and especially well-suited to gaseous flows. While these projections can be used with liquids, both room-temperature and cryogenic, greater spacing between the individual projections may be preferable (in view of the possibility of flow blockage) when used with liquids as compared to gases, due to the higher viscosity of liquids.

The structures and techniques of the first and second subsets of the third set of embodiments (namely, surface roughness and surface projections) may be referred to generally as surface modifications, surface treatments, or surface-area-increasing structures.

According to a third subset of the third set of embodiments, there is provided a feature called transpiration cooling, which is described with reference to FIG. 10. FIG. 10 is a longitudinal cross-sectional view (i.e., taken parallel to the longitudinal or cylindrical axis of the RDE) of a portion of an RDE, showing portions of the annular detonation chamber 1002, the walls 1007, 1009 of the annular detonation chamber 1002, and the injector cavity 1004, upstream of detonation chamber 1002. The wall 1007 is radially outward of the annular detonation chamber 1002 (and corresponds to the radially inner wall of housing 708 of FIG. 7A; see FIG. 7G, discussed above, where the additional coolant channel 793 that goes through housing 708 effectively splits housing 708 into radially inner and radially outer walls), and the wall 1009 is radially inward of the annular detonation chamber 1002 (and corresponds to centerbody outer shell 710-SO of FIG. 7A). As further seen in FIG. 10, the walls 1007, 1009 separate the detonation chamber 1002 from inner coolant channel 1041 and outer coolant channel 1042, respectively. Thus, the inner coolant channel 1041 lies radially inward of the annular detonation chamber 1002 (and corresponds to the coolant supply channel 791, between the centerbody outer shell 710-SO and the centerbody inner shell 710-SI, described above in the second set of embodiments), and the outer coolant channel 1042 lies radially outward of the annular detonation chamber 1002 (and corresponds to the additional coolant channel 793 seen in FIG. 7G and described above in the second set of embodiments). Transpiration cooling is achieved by machining many small holes or pores 1017, 1019 in walls 1007, 1009, respectively, as illustrated. Transpiration cooling is the process of bleeding coolant flow through the small holes 1017, 1019 in the walls 1007, 1009 separating the detonation chamber 1002 from the coolant channels 1042, 1041, respectively. That is, coolant fluid from the coolant channels 1041, 1042 will be caused to travel through the holes 1017, 1019 and onto the adjacent detonation-chamber-side surface of the walls 1007, 1009 by capillary action. As seen in FIG. 10, this bleed flow through holes 1017 and 1019, respectively, forms respective thin films or a cool(er) barrier layers 1027 and 1029 on the respective hot-side walls of the detonation chamber 1002. Thus, this thin film/barrier layer 1027, 1029 is inside the detonation chamber 1002, between the respective detonation chamber wall 1007 or 1009 and the hot combusted flow (generated from detonation/combustion of fuel and oxidizer) that flows inside the detonation chamber 1002. The thin film/barrier layers 1027, 1029 may achieve very significant heat reduction, e.g., by reducing the local equivalence ratio or by absorbing energy. Transpiration cooling is often used with oxidizer flow, e.g., oxygen (though an inert gas like nitrogen or argon is also possible), and can be used with either gaseous or cryogenic liquid fluids as coolant. (It is also possible to provide and use holes in only one of the walls 1007, 1009 for transpiration cooling.)

According to a fourth subset of the third set of embodiments, an ablative lining is provided on an interior wall of the detonation chamber. The ablative lining is a coating provided on the interior wall of the detonation chamber, which is designed to burn away (as a sacrificial material) at a controlled rate during operation of the RDE so as to protect the wall from damage. The ablative lining may prevent the wall from melting by serving as a buffer layer and burning away. The ablative lining may be composed of materials comprising high-temperature, high-strength fibers impregnated with resin, or other materials as will be understood by one of skill in the art. A discussion of materials suitable for the ablative lining is found in "Rocket Propulsion Elements," by G. P. Sutton and O. Biblarz (7th Edition, John Wiley & Sons, New York, 2001), which is hereby incorporated herein by reference. How the ablative lining is applied to the detonation chamber wall surface is also known to one of ordinary skill in the art. Since the ablative lining burns off after a limited period of time, use of an ablative lining is suitable only for finite burn times. Also, where an ablative lining is used on the walls of a detonation chamber, either the detonation chamber is not reusable, or the ablative lining must be reapplied or replaced after every use, depending on the circumstances.

Although ablative linings and transpiration cooling are generally not used in combination for the same component (e.g., detonation chamber wall), otherwise the cooling techniques and structures of the first through fourth subsets of the third set of embodiments can be used in any combination of one or more of them. An example of an ablative lining is illustrated in FIG. 8. As described above, in the structure 830 annular region 834 corresponds to the detonation chamber 702. The annular region 834 (detonation chamber) is bounded/defined by wall 833, which is radially outward of region 834, and wall 837, which is radially inward of region 834. On the radially inner surface of wall 833, that is, the surface adjacent the region 834 (detonation chamber), an ablative lining 838 is provided. While this is an example of an ablative lining employed in combination with another cooling technique/structure, namely, fins 832, an ablative lining may be used on its own without one of the other cooling techniques/structures described here.

According to a fourth set of embodiments, copper or other soft metal sealing gaskets are provided in an RDE, as described below. In an RDE, there are various interfaces or connections between parts where it is necessary to seal the interface/connection to prevent materials (e.g., fuel, oxidizer, coolant) from bleeding to locations where they are not supposed to be, e.g., to bleed from one stage to the subsequent or previous stage of the RDE. In this regard, conventional rubber or silicone seals may not adequately withstand the extreme heat generated in the RDE, e.g., hot-side temperatures in excess of 1500° F. Even ultra-high-temperature gaskets are only suitable for temperature loads of approximately 700° F., and only for intermittent use with such loads.

According to the fourth set of embodiments, sealing gaskets formed of copper, bronze, or any relatively soft metal may be used to seal these interfaces in an RDE. Copper is a relatively soft metal with an extremely high thermal conductivity. Also, the relative softness means that copper can deform slightly when put under load, which can aid with sealing. For example, in some cases, a copper gasket may be machined to be slightly larger than the tolerance allows, so that it deforms to fill gaps when tightened into place. Further, copper has a coefficient of thermal expansion greater than or approximately equal to most varieties of stainless steel, a material commonly used for fabrication of RDEs. This means that copper gaskets have an added benefit that, at high temperatures, the copper gaskets may expand slightly more than the stainless steel hardware, thus again aiding with sealing at high temperatures. The above features of copper also hold for other relatively soft metals. (It will be understood by one of ordinary skill in the art that materials other than stainless steel may be used for fabricating an RDE. Non-limiting examples of such materials include various alloys made by Haynes International.)

Examples of the use of such sealing gaskets, at the fore end of the centerbody 710 where it interfaces with the injector plate 704 and at the aft end of the centerbody 710 where it interfaces with the centerbody endcap 710-E, are described with reference to FIGS. 6, 7D, 7E, and 13.

In FIG. 6, the (e.g., copper) sealing gasket 627-G is shown around hole 627, which is located at the proximal (RDE interface) end 222 of the tubular portion of coupling 205. The combustion products from the PDE igniter 206 (having entered the coupling 205) travel from coupling 205 into the detonation chamber 702 (FIGS. 7F and 7G) of the RDE 700 through hole 627. As discussed above with reference to FIG. 7B, hole 627 interfaces and communicates with the ignition hole 727 in FIG. 7B, and annular gasket groove 727-GG is provided around the ignition hole 727 for mounting therein the sealing gasket 627-G for sealing this junction point between coupling 205 and RDE 700. Sealing gasket 627-G around hole 627 is also shown in an unassembled position in FIG. 7A.

FIG. 7D shows the upstream side of the centerbody endcap 710-E (see FIG. 7A). Centerbody endcap 710-E has an annular groove around its circumference but this annular groove is not visible because a (e.g., copper) sealing gasket 710-EG is seated in it. Sealing gasket 710-EG is for sealing the junction between the (upstream side of) centerbody endcap 710-E and the (downstream side of) centerbody outer shell 710-SO (see FIG. 7A). Just radially inward of the annular groove/sealing gasket 710-EG is an annular recess 710-ER for mounting (interfacing, connecting) the upstream side of the centerbody endcap 710-E on (with) the downstream side of the centerbody outer shell 710-SO.

FIG. 7E shows, at the top of the figure, the downstream side of both the centerbody outer shell 710-SO and the centerbody inner shell 710-SI (see FIG. 7A). As described immediately above with reference to FIG. 7D, the downstream side of the centerbody outer shell 710-SO connects with the (upstream side of) centerbody endcap 710-E, and the sealing gasket 710-EG (FIG. 7D; not shown in FIG. 7E) serves to seal the junction therebetween. As seen in FIG. 7E, the downstream side of the centerbody outer shell 710-SO has an annular groove 710-SOG for interfacing with sealing gasket 710-EG at the circumference of centerbody outer shell 710-SO.

Figure 13:
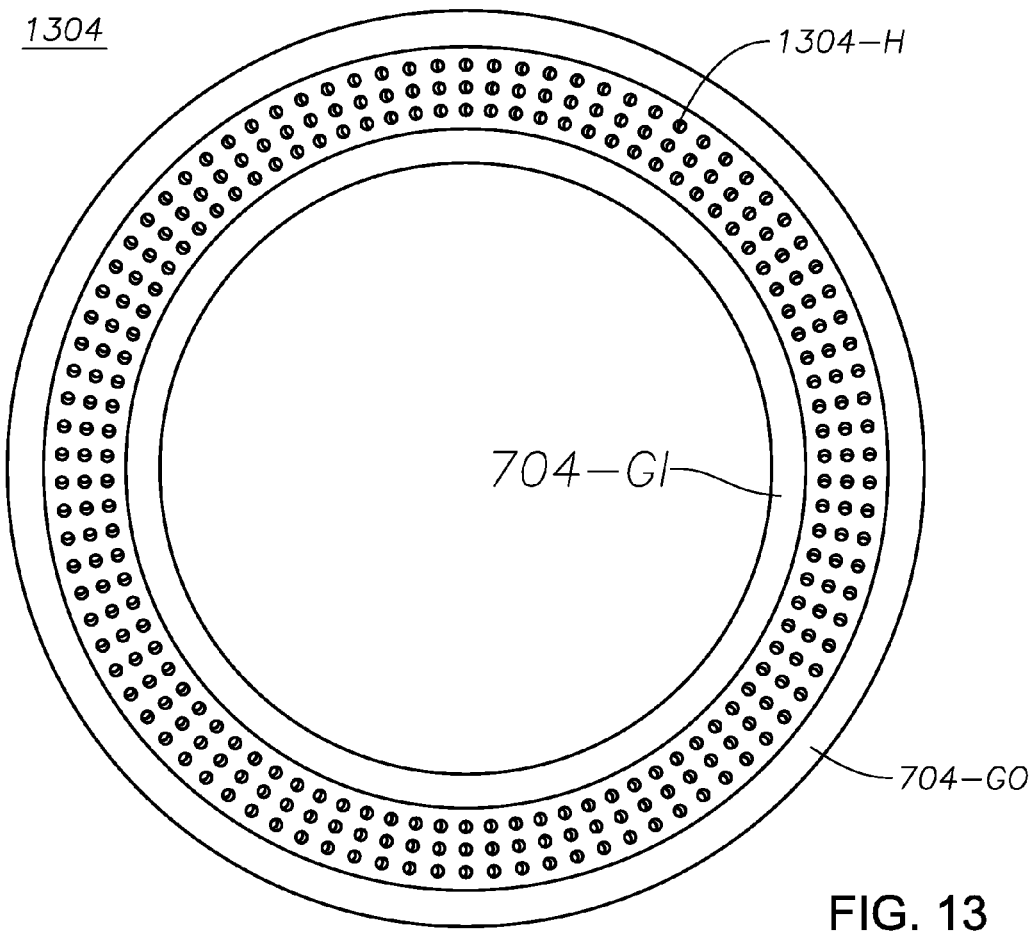
FIG. 13 is a perspective view of an injector plate, showing the upstream face of the injector plate (with radially inner and outer copper sealing gaskets), the injector plate having the straight, angled injection ports of FIG. 12A, in accordance with some embodiments.
Figure 14A:
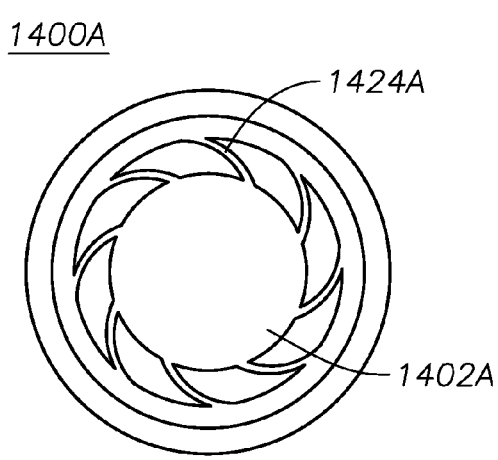
FIG. 14A is a schematic, axial cross-sectional view of an RDE with curved sidewall injection ports, for providing swirled sidewall injection, in accordance with some embodiments.
Figure 14B:
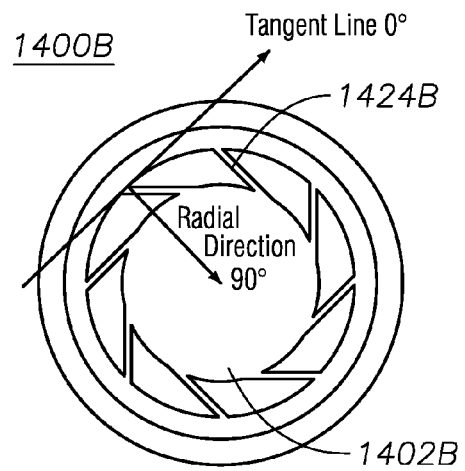
FIG. 14B is a schematic, axial cross-sectional view of an RDE with straight sidewall injection ports, for providing swirled sidewall injection, in accordance with some embodiments.

FIG. 13 shows (e.g., copper) sealing gaskets 704-GO and 704-GI around the outer circumference and the inner circumference, respectively, of the injector plate 704. Injector plate 704 and sealing gaskets 704-GO and 704-GI are also shown in FIG. 7A. As seen in FIGS. 7A and 7E, the injector plate 704 interfaces, at its upstream face, with the head mount 703 and, at its downstream face, with the centerbody outer shell 710-SO. The outer sealing gasket 704-GO serves to seal the interface of the injector plate 704 with the head mount 703, as seen in FIG. 7E, and the inner copper sealing gasket 704-GI serves to seal the interface of the injector plate 704 with the centerbody outer shell 710-SO.

According to a fifth set of embodiments, converging-diverging injection ports or diverging injection ports are provided. Examples of injection ports (also referred to as injection holes or the like) are seen in FIG. 1 (element 114), FIG. 7D (element 714 in head mount 704; only four of eight holes 714 are visible due to the perspective of the figure), FIG. 7E (element 704-H in injector plate 704), and FIG. 13 (element 704-H in injector plate 704). It will be understood that various different designs (e.g., configurations/shapes, locations, arrangements) of the injection holes are possible, including combinations of the designs of the fifth set of embodiments illustrated herein, as well as other designs different from those illustrated herein. Examples of such different designs were discussed above with reference to (holes 114 shown in) FIG. 1. Accordingly, the injection holes described herein may be used for fuel and/or oxidizer, or for a premixed fuel/oxidizer mixture. The fifth set of embodiments, providing converging-diverging or diverging injection ports, thus deals with various different shapes or configurations of injection ports. The converging-diverging or diverging configurations described below may be applied to any of the injection ports described throughout this disclosure, such as those mentioned above. In some embodiments, the converging-diverging and diverging configurations described below are applied to the injection ports 704-H of the injector plate 704 shown in FIG. 7E. Injection ports 704-H are axial (i.e., they enter the detonation chamber 702 at an axial end thereof, specifically, the head end; they are disposed on a surface perpendicular to the longitudinal axis of the RDE 700/detonation chamber 702), rather than sidewall.

One rationale for providing converging-diverging or diverging injection ports is described as follows. The pressure distribution behind a detonation wave is well-described in the literature, and consists of three regions:

1. $P_{inj} < P_{ch}$: Blocked flow. In this region, the injection pressure ($P_{inj}$) is less than the chamber pressure ($P_{ch}$), so there is no flow into the annulus (in fact, the opposite occurs: there is backflow into the injectors).
2. $P_{ch} < P_{inj} < P_{cr}$: Subsonic flow. In this region, the injection pressure is greater than the chamber pressure, but less than the critical pressure ($P_{cr}$) for sonic flow. Inflow is subsonic, and occurs at the injector pressure. The critical pressure for sonic flow is a function of the injection flow stagnation pressure $T_{0,inj}$ and the propellant ratio of specific heats $\gamma_{inj}$ and is given by Equation (1) shown below.
3. $P_{inj} > P_{cr}$: Sonic flow. In this region, the injection pressure is greater than the critical pressure; injection is sonic, and occurs at the critical pressure.

$$P_{cr} = T_{0,inj} \left( \frac{2}{\gamma_{inj} - 1} \right)^{\frac{\gamma_{inj}}{\gamma_{inj}-1}} \qquad (1)$$

The third region identified above may benefit by converging-diverging injection ports. The injection flow pressure (which dictates the detonation wave pressure) in straight (i.e., not converging or diverging) or purely converging injection ports is limited to the critical pressure. Straight or converging injection ports may suffer from choked flow for a significant portion of the annular region behind the detonation wave. The addition of a diverging section in the injection port increases pressure recovery beyond the critical pressure limit. This enables lower injection pressure requirements to achieve a desired detonation chamber pressure condition (and with it an attendant decrease in weight of the RDE due to reduced structural and pumping requirements), or it increases the detonation chamber pressure for a given injection pressure condition (with a corresponding increase in performance). If the sonic condition is provided at the upstream face of the injector plate, a converging section may not be necessary, in which case a simple (solely) diverging section may be used.

FIGS. 11A-11D show examples of possible injection port configurations with converging-diverging or simple diverging sections. Other configurations are possible. Each of FIGS. 11A-11D shows a series of adjacent injection holes, shown in a flat planar projection (even though in an actual RDE the injection holes may be arranged in a circumferential arrangement, such as illustrated, e.g., in FIGS. 1, 7C and 7E). Further, FIGS. 11A-11D show the holes in longitudinal cross section, the cross section being taken along the longitudinal (cylindrical) axis of the holes. (Even though, due to the converging and diverging sections, the injection holes are, strictly speaking, not cylinders, the terminology "longitudinal axis," "cylindrical axis," etc. is used as if the injection holes were cylindrical, along the lines noted above in the description of embodiments with reference to FIG. 1.)

FIG. 11A shows a contoured converging-diverging configuration. In this configuration, each of the holes 1114A converges from its (upstream) entrance to its midpoint 1114A-M (i.e., halfway between its (upstream) entrance and its (downstream) exit), and then diverges from its midpoint 1114A-M to its (downstream) exit. As illustrated, the convergence and divergence occur in a contoured (curved) manner. FIG. 11B shows a conical converging-diverging configuration. In this configuration, as with FIG. 11A, each of the holes 1114B converges from its (upstream) entrance to its midpoint 1114B-M, and then diverges from its midpoint 1114B-M to its (downstream) exit. However, in contrast to FIG. 11A, as illustrated, the convergence and divergence occur in a conical (straight line) manner.

FIG. 11C shows a contoured diverging configuration. In this configuration, each of the holes 1111C diverges from its (upstream) entrance to its (downstream) exit. As illustrated, the divergence occurs in a contoured (curved) manner. FIG. 11D shows a conical diverging configuration. In this configuration, as with FIG. 11C, each of the holes 1111D diverges from its (upstream) entrance to its (downstream) exit. However, in contrast to FIG. 11C, as illustrated, the divergence occurs in a conical (straight line) manner.

A sixth set of embodiments provides for swirled injection of propellants. As discussed above with respect to the second set of embodiments, since the detonation wave needs to propagate in the circumferential direction in order to sustain a continuous detonation wave, it is desirable that the detonation wave be initiated in the circumferential direction (or in a direction approaching the circumferential direction). One way to so control the direction of propagation is by tangential injection of a detonation wave (from a PDE), as described above in the second set of embodiments (FIGS. 2-5). A second method is by the use of swirled injection of propellants, described here in the sixth set of embodiments. That is, by imparting a circumferential velocity component to the injection flow (flow of injected propellants), it is possible to predispose the detonation wave to travel in the desired (i.e., circumferential) direction.

A first way to produce swirled injection is to use axial injection holes that are angled along their axial (longitudinal) extent. These injection holes may be disposed at or near the upstream axial end of the detonation chamber. Also, they may be oriented so as to extend (from upstream entrance to downstream exit of the hole) in a direction at an angle of greater than 0° and less than 90° relative to the longitudinal axis of the detonation chamber (here, an angle of 0° means the downstream direction along or parallel to the longitudinal axis of the detonation chamber/RDE, an angle of 180° means the upstream direction along or parallel to the longitudinal axis of the detonation chamber/RDE, and angles of 90° and 270° are in respective radial directions perpendicular to the longitudinal axis of the detonation chamber/RDE). (Note that, with such angled injection ports, the upstream-to-downstream direction of the injection port is not the same as the upstream-to-downstream direction of the detonation chamber/RDE. The upstream-to-downstream direction of the injection port is a direction at an angle of greater than 0° and less than 90° relative to the longitudinal axis of the detonation chamber, while the upstream-to-downstream direction of the detonation chamber/RDE is the direction of the longitudinal axis of the detonation chamber/RDE).

Examples of these angled injection ports are shown in FIGS. 12A-12C and 13. Configurations other than those illustrated are possible.

Figure 12A:
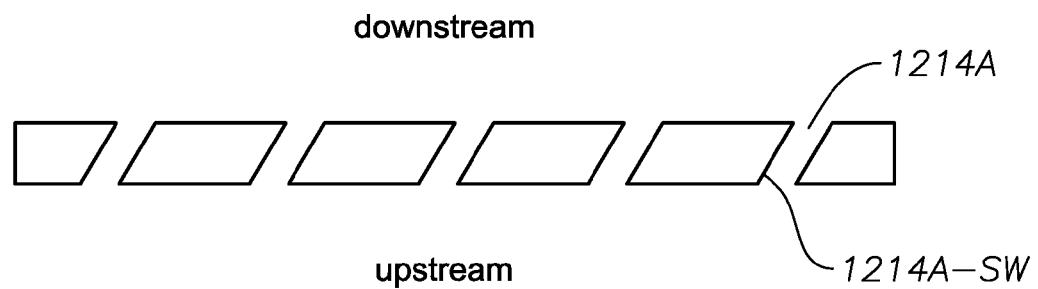
FIGS. 12A-12C are schematic longitudinal cross-sectional views of angled injection port configurations, in accordance with some embodiments, with FIG. 12A showing a straight, angled configuration, FIG. 12B showing a contoured converging-diverging, angled configuration, and FIG. 12C showing a conical converging-diverging, angled configuration.
Figure 12B:
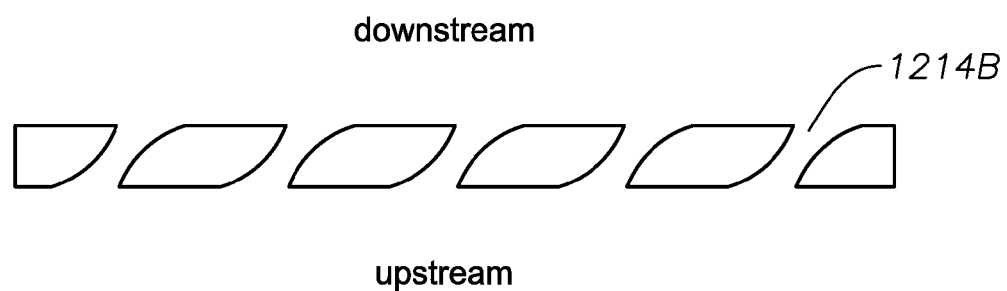
Figure 12C:
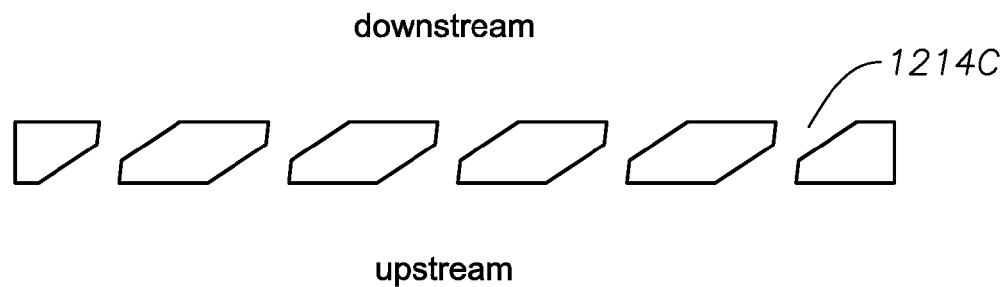

Like FIGS. 11A-11D, each of FIGS. 12A-12C shows a series of adjacent injection holes, shown in a flat planar projection. Also, FIGS. 12A-12C show the holes in longitudinal cross section, the cross section being taken along the longitudinal (cylindrical) axis of the holes. (Again, even though, due to the converging and diverging sections, the injection holes are, strictly speaking, not cylinders, the terminology "longitudinal axis," "cylindrical axis," etc. is used as if the injection holes were cylindrical, along the lines noted above in the description of embodiments with reference to FIG. 1.)

FIG. 12A shows a straight, angled configuration. In this configuration, each of the holes 1214A is angled in its extent from its (upstream) entrance to its (downstream) exit: as illustrated, each hole 1214A extends from its upstream entrance (at a lower, relatively left location in FIG. 12A) to its downstream exit (at an upper, relatively right location in FIG. 12A). Further, the hole 1214A is straight (i.e., not converging and not diverging) in the sense that the illustrated longitudinal cross section of the hole 1214A shows straight lines defining the sidewalls 1214A-SW of the hole 1214A.

FIG. 12B shows a contoured converging-diverging, angled configuration. In this configuration, as with FIG. 12A, each of the holes 1214B is angled in its extent from its (upstream) entrance to its (downstream) exit: as illustrated, each hole 1214B extends from its upstream entrance (at a lower, relatively left location in FIG. 12B) to its downstream exit (at an upper, relatively right location in FIG. 12B). However, in contrast to FIG. 12A, the hole 1214B is contoured converging-diverging (as in FIG. 11A), as seen in the illustrated longitudinal cross section of the hole 1214B.

FIG. 12C shows a conical converging-diverging, angled configuration. In this configuration, as with FIGS. 12A and 12B, each of the holes 1214C is angled in its extent from its (upstream) entrance to its (downstream) exit: as illustrated, each hole 1214C extends from its upstream entrance (at a lower, relatively left location in FIG. 12C) to its downstream exit (at an upper, relatively right location in FIG. 12C). However, in contrast to FIGS. 12A and 12B, the hole 1214C is conical converging-diverging (as in FIG. 11B), as seen in the illustrated longitudinal cross section of the hole 1214C.

FIG. 13 shows a three-dimensional perspective view of an injector plate 1304 having injection ports 1304-H characterized by the straight, angled configuration as in FIG. 12A. These injection ports 1304-H are angled at an angle of 30°. The injection ports 1304-H are arranged circumferentially around the injector plate 1304 (corresponding to injector plate 704 in FIG. 7A). The figure shows the upstream face of the injector plate 1304 (with the aforementioned (e.g., copper) outer and inner sealing gaskets 704-GO and 704-GI (shown also in FIG. 7A).

The angled configurations such as those discussed here may be applied to any of the injection ports described throughout this disclosure, such as those mentioned in the fifth set of embodiments above. In some embodiments, the angled configurations described here are applied to the injection ports 704-H of the injector plate 704 shown in FIG. 7E. These injection ports 704-H are axial (i.e., they enter the detonation chamber 702 (FIGS. 7F and 7G) at an axial end thereof, specifically, the head end; they are disposed on a surface perpendicular to the longitudinal axis of the RDE 700/detonation chamber 702), rather than sidewall.

A second way to produce swirled injection is by swirled sidewall injection. In this case, in contrast to the first way discussed above, the injection ports are disposed on the cylindrical sidewall of the detonation chamber, rather than in an axial injection arrangement at or near the upstream axial end thereof (the injection ports also enter the detonation chamber from the sidewall thereof and hence, even if they are located near the head end, they do not enter the detonation chamber, strictly speaking, at or from an axial end thereof). Also, the swirled sidewall injection ports may extend (from upstream entrance to downstream exit of the hole) in a circumferential direction (described specifically, below), rather than in a direction at an angle of greater than 0° and less than 90° relative to the longitudinal axis of the annular detonation chamber. Put another way, the center line of each of the swirled sidewall injection ports may be curved. (Note that, again, with such curved injection ports, the upstream-to-downstream direction of the injection port is not the same as the upstream-to-downstream direction of the detonation chamber/RDE. The upstream-to-downstream direction of the injection port is a circumferential direction (described specifically, below) similar to that of the annular detonation chamber, while the upstream-to-downstream direction of the detonation chamber/RDE is the longitudinal direction of the detonation chamber/RDE).

FIG. 14A shows an axial cross section (i.e., a cross section perpendicular to the longitudinal axis) of an RDE 1400A with curved sidewall injection ports 1424A for providing swirled sidewall injection. As illustrated, a plurality of ports 1424A may be arranged in a circumferential arrangement around the detonation chamber 1402A. Each port 1424A (e.g., the center line thereof) extends in a circumferential direction (or in a curved manner) from port entrance (located radially outside of the detonation chamber 1402A) to port exit (which goes into the detonation chamber 1402A). The center line of the port 1424A (or the circumferential direction in which the port 1424A extends) is defined by a curve that has a greater curvature than the curvature of the annular detonation chamber 1402A. This greater curvature permits the ports 1424A to start at a radially exterior position (radially outside of the detonation chamber 1402A) and end at a radially interior position (at the radially outer boundary of the detonation chamber 1402A). However, the curvature of the center line of the port 1424A, while greater than the curvature of the annular detonation chamber 1402A, exceeds the curvature of the annular detonation chamber 1402A by only a limited extent, such that the injection flow exits the port 1424A with a positive (non-zero) component of velocity in the (clockwise) circumferential direction of the annular detonation chamber 1402A. If the curvature of the port 1424A were too great, the injection flow could enter the detonation chamber 1402A in a radial direction (i.e., toward the center of the circle, in FIG. 14A) or even in an opposite (i.e., counterclockwise) circumferential direction.

Summing up the above description, swirled sidewall injection provided by curved sidewall injection ports (e.g., 1424A) may be described as follows: each of the plurality of injection ports (e.g., 1424A) is disposed on a sidewall of the detonation chamber (e.g., 1402A) and is characterized by (its centerline having) a curvature as it extends from an upstream end of the injection port configured for receiving the fuel and/or the oxidizer to a downstream end of the injection port configured for injecting the fuel and/or the oxidizer into the detonation chamber, wherein the curvature is in a circumferential direction and is greater than the curvature of the sidewall of the detonation chamber (or put another way, greater than the curvature of the annulus defining the annular shape of the detonation chamber).

As discussed above, e.g., with reference to FIG. 1, sidewall injection may be used with standard or other kinds of injection ports, and it is not restricted to use with curved/circumferentially extending injection ports or with swirled injection. While FIG. 14A shows curved/circumferentially extending injection ports 1424A, FIG. 14B illustrates RDE 1400B according to another embodiment, in which swirled sidewall injection is provided using angled straight-line (rather than curved/circumferentially extending) injection ports 1424B. In such embodiments, the straight-line injection ports 1424B enter the wall of the detonation chamber 1402B at an angle relative to the radial direction and at an angle relative to the tangential direction, specifically, at an angle greater than 0° and less than 90° relative to the sidewall of the detonation chamber 1402B. (In this context, entering the wall of the detonation chamber at an angle of 90° means entering the wall of the detonation chamber in a radial direction; injection ports 114 in FIG. 1 enter the wall of the detonation chamber 102 at an angle of 90°. An angle of 0° refers to a line tangent to the circle defining the annular wall of detonation chamber; as a line tangent to the circle never enters the circle, a hypothetical injection port at an angle of 0° would never enter the detonation chamber.) Accordingly, injection ports 1424B may also be described as: (a) entering the detonation chamber 1402B at an angle other than 90°; (b) not entering the detonation chamber 1402B at an angle of 90°; (c) entering the detonation chamber 1402B at an angle other than 0°; (d) etc.

Injection ports 1424B may also be characterized as having an "effective curvature" in the circumferential direction of (or around) the annular detonation chamber 1402B, the effective curvature being greater than the curvature of the sidewall of the detonation chamber (or the effective curvature being greater than the curvature of the annulus defining the annular shape of the detonation chamber). The term "effective curvature" is to be understood in terms of the relative positions of the upstream end and the downstream end of the injection port. Note that a curved sidewall injection port such as 1424A and an angled straight-line injection port such as 1424B may have their respective upstream ends at the same location (on the exterior of the detonation chamber sidewall) and their respective downstream ends at the same location (on the interior of the detonation chamber sidewall). In such a case, the angled straight-line injection port 1424B would be said to have an effective curvature equal or equivalent to the curvature of the curved sidewall injection port 1424A.

Similarly, curved sidewall injection ports 1424A may be said to be "effectively oriented" or "effectively angled" at an angle greater than 0° and less than 90° relative to the sidewall of the detonation chamber 1402A. With the same meaning, curved sidewall injection ports 1424A may be said to "effectively enter" the detonation chamber 1402A at an angle greater than 0° and less than 90° relative to the sidewall of the detonation chamber 1402B (hence at an angle relative to the radial direction and at an angle relative to the tangential direction).

With respect to swirled sidewall injection as here described, it is noted that, as illustrated in FIGS. 14A and 14B, the sidewall injection ports (e.g., 1424A or 1424B) may be located all on one side of the detonation chamber (1402A or 1402B), more specifically, on the radially outer side of the detonation chamber and not on the radially inner side of the detonation chamber. Also, the sidewall injection ports may all be located at the same radial position relative to (or same radial distance from the center of) the RDE, detonation chamber, or other cylindrical (or other symmetrical closed-shape) component of the RDE. It may also be noted that, as illustrated in FIGS. 14A and 14B, the sidewall injection ports (e.g., 1424A or 1424B) may all be angled or effectively angled at an angle greater than 0° and less than 90° relative to the sidewall of the detonation chamber, and may all have a curvature or an effective curvature greater than the curvature of the sidewall of the detonation chamber (it will be understood that various equivalent formulations of these descriptions, along the lines described above, may be stated). Also, the sidewall injection ports may all be angled or effectively angled at the same angle, and may all have the same curvature or effective curvature. While FIGS. 14A and 14B show detonation chambers 1402A and 1402B configured for travel of the detonation wave in the clockwise direction, it will be understood that, where the detonation chamber is configured for travel of the detonation wave in the counterclockwise direction, the orientation (angles, curvatures) of the sidewall injection ports may be modified accordingly. It will be understand that, in such case, the descriptions of the sidewall injection ports given here in terms of the language "at an angle greater than 0° and less than 90° relative to the sidewall of the detonation chamber" would still apply.

A seventh set of embodiments provides for use of a fluidic valve in an RDE. In some of these embodiments, a fluidic valve is coupled to an injector of the RDE. In others of these embodiments, a fluidic valve and a premixing chamber are combined as a single element of an RDE.

The use of a fluidic valve to reduce the interruption time of an injector in a high-frequency detonation application was proposed in "Experimental Study of a High-Frequency Fluidic Valve Fuel Injector" by E. M. Braun, T. S. Balcazar, D. R. Wilson, and F. K. Lu (Journal of Propulsion and Power, 28(5):1121-1125, 2012). Additional description of fluidic valves can be found in U.S. Provisional Patent Application No. 61/513,484 by Braun et al. filed on Jul. 29, 2011. Both this article and this provisional patent application are hereby incorporated herein by reference.

One of the characteristics of an RDE is the region behind the detonation wave for which the detonation chamber pressure is greater than the injector plenum pressure. It is beneficial to reduce the length of this region as much as possible, so as to limit backflow from the detonation chamber into the injectors. Such backflow interrupts injection and accordingly reduces the frequency of injection and hence the frequency of operation of the RDE. A fluidic valve may serve to mitigate this backflow and to increase the propellant mass flow per cycle. A fluidic valve generally has no moving parts and operates by using the natural behavior of the fluid based on the principles of fluid dynamics that govern fluid flow, in contrast to a mechanical or other valve that has moving parts.

In some embodiments, separate fluidic valves may be coupled to each of the fuel and oxidizer flows, e.g., just downstream of the initial injection of fuel and oxidizer in the head mount. In other embodiments, fluidic valves may be coupled to an upstream premixing chamber to receive therefrom premixed (combined fuel and oxidizer) flow. In still other embodiments, as illustrated in FIGS. 7C and 7F (described below), the fluidic valve and premixing chamber are combined into a single element. In these embodiments, fuel and oxidizer are each injected at several points around the annulus, and the complex flow dynamics inside the injector are harnessed to enhance propellant mixing. Combining the fluidic valve and the premixing chamber into a single element (thereby eliminating the need for a separate premixing chamber) decreases the overall size and weight of the RDE, which aids practical operational utility.

As seen in FIG. 7C, injectors for fuel and/or oxidizer (propellant injection holes 714) are provided in head mount 703 (FIG. 7A), and the propellants entering these injectors 714 flow out of them into a combined fluidic valve and premixing chamber 712 immediately downstream of and in fluid communication with the injectors 714. As further seen in FIG. 7C, the fluidic valve-premixing chamber 712 is configured as an annular channel or recess formed in the rear (downstream) face of head mount 703; the annular channel is rather deep relative to the total depth (longitudinal extent) of head mount 703. While FIG. 7C offers a three-dimensional perspective view of the fluidic valve-premixing chamber 712, FIG. 7F shows a longitudinal cross-sectional view of the fluidic valve-premixing chamber 712. As also seen in FIG. 7F, the outflow from the fluidic valve-premixing chamber 712 flows downstream into the injector plate 704 (injector plate 704 is shown also in FIGS. 7A, 7E and 13). Accordingly, this arrangement may be understood to contain different stages of injectors/injection, as described above. First, fuel and oxidizer is injected into head mount 703 by injectors (propellant injection holes 714, FIG. 7C). Then, the fuel and oxidizer flow from these injectors 714 into the fluidic valve-premixing chamber 712, where they are mixed. Finally, the premixed combination of fuel and oxidizer flows into the injection ports 704-H in the injector plate 704 and from there into the detonation chamber 702. To describe the operation of the fluidic valve-premixing chamber 712 in more detail, it is noted that the fluidic valve-premixing chamber 712 may have a generally rectangular cross-section plenum cavity which, as indicated, is disposed between the detonation chamber 702 and the injectors 714. The configuration of the fluidic valve-premixing chamber 712 is further characterized in that its cross-sectional area increases suddenly shortly downstream of the injectors 714. This sudden increase in area attenuates the shock wave entering the cavity, allowing the supply pressure of the propellants (mixed fuel and oxidizer) to more quickly push the contact surface between combustion products and propellants back out of the igniters and refuel the RDE.

In the following, alternate descriptions of some of the embodiments and aspects of the seventh set of embodiments are presented.

According to a first given embodiment, an RDE may comprise a detonation chamber configured to allow continuous detonation therein of a mixture of fuel and oxidizer, and a fluidic valve upstream of the detonation chamber, configured to convey at least one of the fuel and the oxidizer into the detonation chamber. (The at least one of the fuel and the oxidizer need not be conveyed directly into the detonation chamber; that is, the at least one of the fuel and the oxidizer may be convey from the fluidic valve via another element (e.g., injection ports 704-H) into the detonation chamber.)

The RDE according to the first given embodiment may further comprise a plurality of injection ports (e.g., 704-H) (a) disposed downstream of the fluidic valve and upstream of the detonation chamber, and (h) configured for receiving at least one of the fuel and the oxidizer from the fluidic valve and injecting at least one of the fuel and the oxidizer into the detonation chamber.

The RDE according to the first given embodiment may further comprise a plurality of injectors (e.g., 714) (a)

disposed upstream of the fluidic valve, and (b) configured for conveying at least one of the fuel and the oxidizer into the fluidic valve.

In the RDE according to the first given embodiment, the fluidic valve may function also as a premixing chamber for mixing the fuel and the oxidizer prior to injection of the fuel and the oxidizer into the detonation chamber.

In the RDE according to the first given embodiment, the fluidic valve may be configured as an annular channel formed in a structure (e.g., head mount 703) upstream of the detonation chamber.

In the RDE according to the first given embodiment, the fluidic valve may comprise (a) an upstream portion and (b) a downstream portion disposed downstream of the upstream portion, and the fluidic valve may be configured such that a cross-sectional area of the downstream portion exceeds a cross-sectional area of the upstream portion. Put in other words, as the fluidic valve extends (in the) downstream (direction), the cross-sectional area of the fluidic valve may increase. This increase may be sudden as described above.

The RDE according to the first given embodiment may be characterized by any one or more of the above descriptions.

While the illustrations of the seventh set of embodiments show axial injection, it is also possible to use sidewall injection with a fluidic valve.

The specific configurations and arrangements of fluidic valves described and illustrated here are just examples; many different configurations and arrangements are possible.

According to an eighth set of embodiments, an RDE is provided with flow turning vanes at or near the exit plane of the RDE. (The language "at or near the exit plane of the RDE" should be understood to encompass both cases where the flow turning vanes are within the RDE and those where the flow turning vanes are outside e.g., downstream, of the RDE, as described below.) Since the detonation wave travels in a circumferential direction in the detonation chamber, it is understood that there may be a degree of swirl (that is, flow in a direction other than the axial direction) in the exit flow (that is, the flow that exits the downstream end of the RDE). This is particularly true if swirled injection (e.g., as described above in sixth set of the embodiments) is used. As a component of velocity not aligned with the RDE axis, swirl represents a potentially significant reduction in performance. In addition, conservation of angular momentum dictates that any swirl present in the exit flow will cause a force (torque) on the RDE opposing the thrust. This torque also affects in many ways the design of systems to which the RDE is mounted.

To counteract the effect of this unwanted torque and to reduce the afore-mentioned performance loss, flow turning vanes can be installed at or near the exit plane of the RDE to de-swirl the exhaust flow, that is, to change the direction of the exit flow to a direction more aligned with the axial direction. Put in other words, the flow turning vanes may reduce a component of the flow velocity that is not in the axial direction. These vanes can be fixed in position or adjustable (movable, repositionable), with the latter providing greater operational flexibility. For example, with adjustable vanes, the orientation or angle of the vane (e.g., relative to the longitudinal axis of the RDE) could be varied so as to appropriately compensate for the particular swirl angle, as the swirl angle of the flow may vary over time, over different operating conditions, over different injection port configurations (e.g., injection port angle; injection port location (sidewall versus axial)), etc. In addition, these flow turning vanes can be used as thrust vectoring devices (see tenth set of embodiments, below), particularly if adjustable and if independently controllable.

Figure 15:
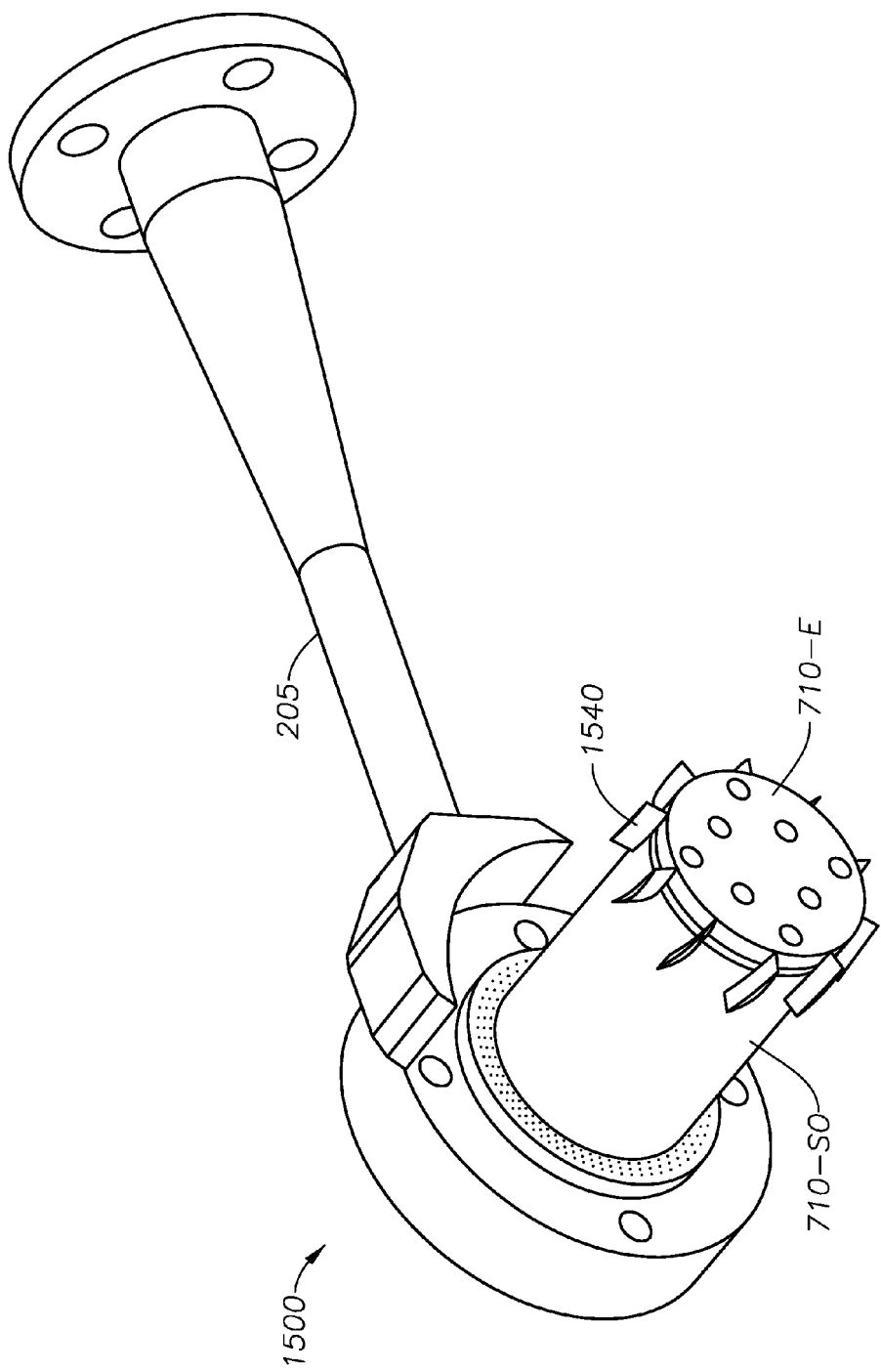
FIG. 15 is a schematic perspective view of an RDE (with the housing, housing endcap, and gaskets removed) and the coupling of FIGS. 2 and 6, the RDE having flow turning vanes installed therein, in accordance with some embodiments.

FIG. 15 shows an example configuration of fixed position flow turning vanes 1540 installed in an RDE 1500. Except for vanes 1540, RDE 1500 is the same as RDE 700 depicted in FIG. 7A, but RDE 1500 is assembled, not exploded, and in FIG. 15 the housing 708 and associated elements have been removed in order to show the vanes 1540. As illustrated in FIG. 15, the flow turning vanes 1540 may be mounted on the outer surfaces of centerbody outer shell 710-SO and centerbody endcap 710-E, hence inside the detonation chamber 702 (see FIGS. 7F and 7G), at the downstream end thereof. The configuration/shape, orientation, position, and arrangement of vanes 1540 may vary from what is illustrated. For example, vanes 1540 may be flat plates, curved airfoil shapes, or other configurations. Vanes 1540 may also be located outside of the RDE 1500, downstream of the RDE 1500, e.g., immediately downstream of the exit so that the exhaust flow leaves the detonation chamber 702 and directly encounters the flow turning vanes 1540. In terms of FIG. 15, where the flow heading toward the exit has a component in the clockwise circumferential direction, when the flow strikes the flow turning vanes 1540, the vanes 1540 will serve to deflect the flow to a more axial direction. In some embodiments, in addition to or instead of flow turning vanes, where angled injection ports (sixth set of embodiments) are used, the angle of the injection ports can be adjusted to affect or limit the swirl of the exit flow.

According to a ninth set of embodiments, there is provided an arrangement (RDE system) comprising multiple concentric (or nested) RDEs/detonation chambers. The annular configuration of an RDE lends itself to arrangements of multiple concentric RDEs or detonation chambers. For example, one or more smaller RDEs (or detonation chambers) could be fitted inside the centerbody inner shell 710-SI (FIG. 7A) of RDE 700, with all of the RDEs being concentric. In this way, the otherwise empty and unused radially interior region inside centerbody inner shell 710-SI could be filled with one or more additional RDE/detonation chamber(s), providing additional thrust, power, etc. in an engine of the same volume. As described here in the ninth set of embodiments, multiple concentric RDEs/detonation chambers may be used in airbreathing modes and/or conventional rocket modes.

Figure 16B:
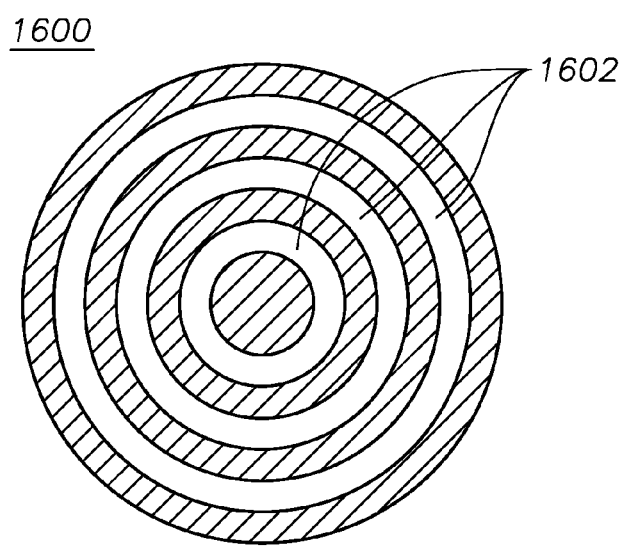

FIGS. 16A and 16B illustrate an example arrangement of multiple concentric annular RDEs. FIG. 16A is a longitudinal cross-sectional view extending the length of the engine, while FIG. 16B is an axial cross-sectional view, the cross section taken at a position downstream of the injector ports and upstream of the aerospike nozzles. As seen in FIG. 16A, the engine 1600 includes (in order from upstream to downstream, i.e., going from left to right in the figure), a propellant inlet 1614 for propellant injection, a propellant manifold 1612, which could serve as a premixing chamber, injector ports 1604-H, detonation chambers 1602, and toroidal aerospike nozzles 1613-N at the exhaust end or exit. While in this depiction, each annular detonation chamber 1602 is equipped with a partial aerospike (plug) nozzle 1613-N, the entire nozzle configuration need not be so restricted For example, in some other embodiments, the concentric RDEs/detonation chambers may exhaust into a common bell nozzle. While FIGS. 16A and 16B show an engine 1600 having three concentric RDEs/detonation chambers 1602, there is no theoretical upper limit to the number of concentric RDEs/detonation chambers that may be mounted concentrically, although practical considerations may impose an upper limit.

Figure 17:
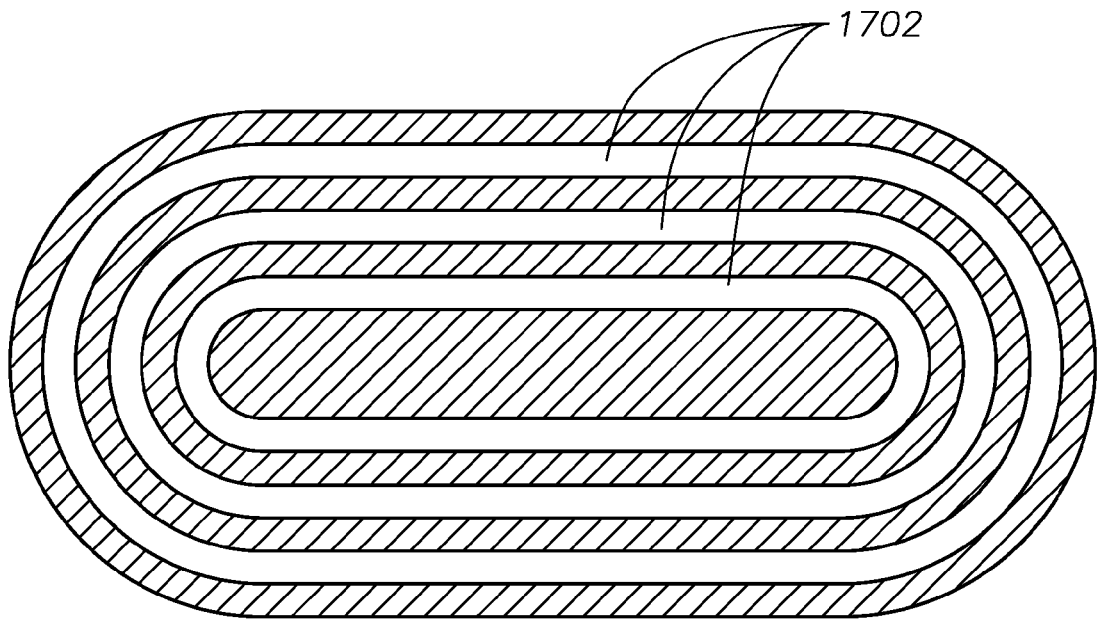
FIG. 17 is a schematic view of an arrangement of multiple concentric RDEs/detonation chambers that are not annular in shape, in accordance with some embodiments.

Again, as mentioned in describing other embodiments, the RDEs or detonation chambers need not be annular (circular). It is sufficient if they have a curved closed shape, e.g., any generally rounded or curved shape that is closed, such as a ring, loop, or sleeve, whether it be circular, oval, elliptical, or another generally curved shape, and regardless of whether or not the shape is uniform or regular along its perimeter. Further, the curved closed shape need not be continuously curved; it may be partly curved and partly not curved (e.g., partly straight), e.g., a partial (e.g., half) annulus whose two ends are connected by a straight portion; or two parallel straight portions connected by two half-annuli, as shown in FIG. 17. As long as multiple RDEs/detonation chambers have substantially the same closed curved shape (whether continuously curved or not), they may be efficiently nested concentrically to form an engine containing multiple RDEs/detonation chambers. FIG. 17 shows an example of an engine 1700 including three concentric RDEs/detonation chambers 1702.

A tenth set of embodiments provides various arrangements to achieve thrust vectoring, which is changing the direction of the thrust. Thrust vectoring can be used, e.g., to steer or turn a vehicle (e.g., aircraft, spacecraft, ship) that is powered by the RDE. Thrust vectoring can also serve to counteract undesired torque generated due to the swirl of the exit flow.

Figure 18:
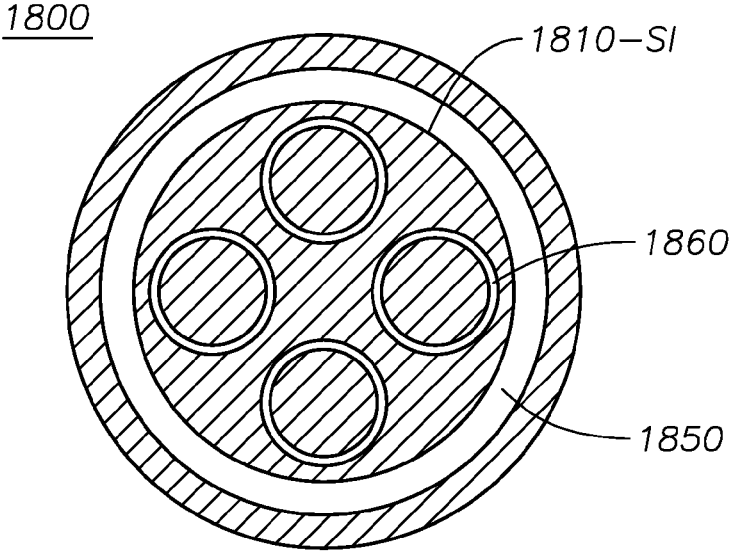
FIG. 18 is a schematic view of an arrangement including a main RDE/detonation chamber and multiple secondary RDEs/detonation chambers housed within the annular central region of the main RDE/detonation chamber, in accordance with some embodiments.

FIG. 18 illustrates an arrangement for achieving thrust vectoring. Specifically, FIG. 18 shows an RDE 1800 including a main engine (primary detonation chamber) 1850 and multiple subengines (smaller, secondary detonation chambers) 1860 housed within the annular central region (e.g., within centerbody inner shell 1810-SI) of the main engine 1850. While four subengines 1860 are shown, another number of subengines could be used. In some embodiments, RDE 1800 includes only the subengines 1860, without a main engine 1850. While FIG. 18 shows the subengines 1860 arranged parallel to the centerline (cylindrical/longitudinal axis) of the main engine 1850, this is not required and other arrangements are possible. For example, subengines 1850 may be canted or angled relative to the centerline.

Since each subengine 1860 is located in a position that is not centered/symmetric about the centerline of engine 1850/RDE 1800, each subengine 1860 will produce off-centerline thrust (which may also be referred to as offline thrust). In operation, thrust vectoring may be achieved by generating different thrusts in one or more of the subengines 1860 (if the same thrust were generated in all of the subengines 1860, thrust vectoring would not be achieved). For example, increasing (or decreasing) the thrust in any one subengine 1860, relative to the others, would produce off-centerline thrust. Changing the thrust in a given subengine 1860 may be achieved in different ways, e.g., by changing the equivalence ratio or fuel-to-oxidizer ratio, or by changing the injection pressure, in that subengine 1860. Accordingly. the injection system (valving, timing mechanisms, etc.) of each one of the primary engine 1850 and the secondary engines 1860 may be individually controllable. Thus, RDE 1800 may have a primary injection means for the primary detonation chamber 1850 and respective secondary injection means for each of the secondary detonation chambers 1860, such that the primary and multiple respective secondary injection means are collectively configured to permit the primary detonation chamber and each of the secondary detonation chambers to be independently controlled. For example, the primary injection means may be configured to permit the primary detonation chamber to be controlled independently of the secondary detonation chambers, and each of the secondary injection means may be configured to permit the respective secondary detonation chamber to be controlled independently of the primary detonation chamber and independently of the other secondary detonation chambers. In various embodiments, RDE 1800 may be provided with one or more of various other features (components or functionalities of an apparatus or method of use thereof) that may facilitate the thrust vectoring described here, which is achieved by generating different thrusts in one or more subengines 1860. One example of such a feature would be separate pressurization and/or pumping systems, configured to adjust the chamber pressure inside each subengine 1860, so that the chamber pressure of each subengine 1860 may be individually controlled, independently of the other subengines 1860. Another example of such a feature would be the use of multiple different propellants for different engines/subengines, for example, a large engine could use a low-detonahility fuel (e.g., propane), and the smaller engines could use a higher-detonability one (e.g., hydrogen).

If a subengine 1860 is canted or angled relative to the centerline of the main engine 1850/RDE 1800, that in itself would cause the thrust generated by that subengine 1860 to have a component directed at an angle relative to the centerline. This may be used to enhance thrust vectoring and/or provide for redundancy.

Thrust vectoring, or generating offline thrust, reduces the aerodynamic load on selected control surfaces of the vehicle being powered. This allows the vehicle to turn more tightly (smaller turning radius) than it would otherwise be able to, or to effect the same degree of directional control while using smaller, lighter control surfaces (or in some cases without certain control surfaces).

Flow turning vanes (eighth set of embodiments, discussed above) may also be used to achieve thrust vectoring, inasmuch as these vanes can change the direction of the exit flow. While flow turning vanes can be used to de-swirl the exhaust flow, e.g., so as to align the flow with the centerline (as discussed above in the eighth set of embodiments), flow turning vanes can also be used to change the direction of the flow so that it is not aligned with the centerline (e.g., so that it is directed at an angle relative to the centerline).

In some embodiments, RDE 1800 may have counter-rotating multiple subengines 1860. That is, for example, RDE 1800 could have a total of two subengines 1860, one in which the detonation flow rotates in a clockwise direction, and another in which the detonation flow rotates in a counterclockwise direction. These two subengines 1860 would thus generate torque in directions opposite to one another. Thus, the torque generated by the first subengine 1860 would tend to counteract the torque generated by the second subengine 1860. The respective torques produced by the two subengines 1860 would tend to cancel each other out, and thus to eliminate the undesired torque altogether and its negative effect on performance. Variations of this arrangement are possible. For example, the number of subengines 1860 may be varied. The subengines could be arranged side by side or concentrically.

As noted below, any embodiment referenced herein is freely combinable with any one or more of the other embodiments referenced herein, and any number of features of different embodiments is combinable with one another, unless indicated otherwise or so dictated by the description herein. One example of combining embodiments is a combination of the second set of embodiments (using the engine core or centerbody region of the RDE for active cooling of the radially inner annular wall of the detonation chamber) and the ninth set of embodiments (multiple concentric RDEs). In such a combination, one or more concentric RDEs may be contained within the centerbody region of the main or outermost RDE, and the coolant channel, comprising coolant supply and coolant return channels, may cool both the outermost RDE and the inner RDE(s). Another example of combining embodiments is a combination of the second set of embodiments and the tenth set of embodiments (thrust vectoring using, e.g., a main engine and a plurality of subengines). In such a combination, one or more subengines may be contained within the centerbody region of the main or outermost RDE, and the coolant channel, comprising coolant supply and coolant return channels, may cool both the outermost RDE and the subengines.

With regard to the second, ninth and tenth sets of embodiments, the instant inventors understand that the centerbody of the RDE has not heretofore been used to house such functional components (i.e., coolant channels, concentric engines, or subengines). Conventionally, RDEs have not been built large enough to feasibly accommodate such functional components within the centerbody. With regard to the eighth set of embodiments (flow turning vanes, to counteract swirl in the exit flow), it will be understood that past research has not definitively determined whether swirl exists in the exit flow of an RDE. Accordingly, the underlying problem of exit swirl, and hence the need for a solution, has not necessarily been appreciated.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments is combinable with one another, unless indicated otherwise or so dictated by the description herein.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged (including, e.g., steps re-ordered), or otherwise altered.

This disclosure may include descriptions of various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

The invention claimed is:

1. A rotating detonation engine, comprising:
a cylindrical outer housing including a front end, a rear end, and a central longitudinal axis that extends between the front and rear ends;
a head mount mounted to the front end of the cylindrical outer housing, the head mount including injection ports configured to deliver fuel and oxidizer to the rotating detonation engine, coolant inflow holes configured to deliver coolant to the rotating detonation engine, and a coolant outflow hole configured to deliver coolant from the rotating detonation engine;
a cylindrical inner shell contained within the cylindrical outer housing, the inner shell including a central coolant return channel that extends along the central longitudinal axis of the housing that is in fluid communication with the coolant outflow hole of the head mount;
a cylindrical outer shell positioned between the inner shell and the cylindrical outer housing;
a first annular gap formed between the outer shell and the cylindrical outer housing, the first annular gap functioning as a detonation chamber configured to facilitate continuous detonation of a mixture of fuel and oxidizer; and
a second annular gap formed between the inner shell and the outer shell radially inward of the detonation chamber, the second annular gap functioning as a coolant supply channel, the second annular gap being in fluid communication with the coolant inflow holes of the head mount and the central coolant return channel of the inner shell,
wherein, during operation of the rotating detonation engine, coolant can circulate through the coolant inflow holes of the head mount and the front end of the cylindrical outer housing, through the second annular gap formed between the inner and outer shells toward the rear end of the housing radially inward of the detonation chamber, through the central coolant return channel of the inner shell also radially inward of the detonation chamber back toward the front end of the housing, and through the coolant outflow hole of the head mount to provide cooling to a center region of the rotating detonation engine.

2. The rotating detonation engine of claim 1, wherein the injection ports of the head mount are axial injection ports extending at an angle greater than 0° and less than 90° relative to the central longitudinal axis of the cylindrical outer housing.

3. The rotating detonation engine of claim 2, wherein each injection port is (1) straight, (2) contoured converging-diverging, or (3) conical converging-diverging.

4. The rotating detonation engine of claim 1, wherein the cylindrical outer housing further includes a coolant inlet hole and a coolant outlet hole formed through a side of the housing and auxiliary coolant channels formed within the housing that are in fluid communication with the inlet and outlet holes, wherein the auxiliary coolant channels provide additional cooling to the rotating detonation engine.

5. The rotating detonation engine of claim 1, wherein the head mount further includes a mixing chamber in fluid communication with the injection ports.

6. The rotating detonation engine of claim 5, wherein the mixing chamber is configured as an annular recess formed in an inner side of the head mount.

7. The rotating detonation engine of claim 6, further comprising an injection plate positioned between the mixing changer and the second annular gap, the injection plate including a plurality of injection holes through which the fuel and oxidizer can pass to reach the first annular gap.

8. The rotating detonation engine of claim 1, further comprising an end cap mounted to ends of the inner and outer shells.

9. The rotating detonation engine of claim 8, wherein the inner shell further includes mounting legs to which the end cap is mounted.

10. The rotating detonation engine of claim 9, wherein gaps between the legs of the inner shell form coolant recirculation ports that provide flow paths between the second annular gap and the central coolant return channel.

11. The rotating detonation engine of claim 1, further comprising an igniter connected to the cylindrical outer housing and configured to ignite a mixture of the fuel and oxidizer within the first annular gap.

12. The rotating detonation engine of claim 11, wherein the igniter is a pulse detonation engine.

* * * * *